United States Patent
Huang et al.

(10) Patent No.: US 11,856,631 B1
(45) Date of Patent: Dec. 26, 2023

(54) METHOD AND APPARATUS FOR HANDLING VALIDITY TIMER FOR HANDOVER IN A WIRELESS COMMUNICATION SYSTEM

(71) Applicant: ASUS Technology Licensing Inc., Taipei (TW)

(72) Inventors: Yi-Hsuan Huang, Taipei (TW); Meng-Hui Ou, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/204,777

(22) Filed: Jun. 1, 2023

Related U.S. Application Data

(60) Provisional application No. 63/393,784, filed on Jul. 29, 2022, provisional application No. 63/352,109, filed on Jun. 14, 2022, provisional application No. 63/351,224, filed on Jun. 10, 2022.

(51) Int. Cl.
*H04W 36/00* (2009.01)
*H04W 76/20* (2018.01)
*H04W 84/06* (2009.01)

(52) U.S. Cl.
CPC ..... *H04W 76/20* (2018.02); *H04W 36/00837* (2018.08); *H04W 84/06* (2013.01)

(58) Field of Classification Search
None
See application file for complete search history.

(56) References Cited

U.S. PATENT DOCUMENTS

2023/0217306 A1* 7/2023 Kim ............... H04W 28/06
370/329

* cited by examiner

*Primary Examiner* — Suhail Khan
(74) *Attorney, Agent, or Firm* — Skaar Ulbrich Macari, P.A.

(57) ABSTRACT

Methods, systems, and apparatuses can comprise a User Equipment (UE) receiving a system information including at least a first Non-terrestrial Network (NTN) configuration for a serving cell, starting or restarting a validity timer for the serving cell in response to receiving the system information, receiving a Radio Resource Control (RRC) reconfiguration message with ReconfigurationWithSync for a target cell, stopping, in response to receiving the RRC reconfiguration message, the validity timer that is running based on the first NTN configuration, and starting the validity timer based on a second NTN configuration for the target cell.

20 Claims, 16 Drawing Sheets

METHOD AND APPARATUS FOR HANDLING VALIDITY TIMER FOR HANDOVER IN A WIRELESS COMMUNICATION SYSTEM

CROSS-REFERENCE TO RELATED APPLICATIONS

The present Application claims priority to and the benefit of U.S. Provisional Patent Application Ser. No. 63/351,224, filed Jun. 10, 2022, U.S. Provisional Patent Application Ser. No. 63/352,109, filed Jun. 14, 2022, and U.S. Provisional Patent Application Ser. No. 63/393,784, filed Jul. 29, 2022; with each of the referenced applications and disclosures fully incorporated herein by reference.

FIELD

This disclosure generally relates to wireless communication networks and, more particularly, to a method and apparatus for handling validity timer for handover in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for handling a validity timer during a Non-terrestrial Network (NTN) to NTN handover procedure such that a User Equipment (UE) will not incorrectly consider the assistance information for NTN invalid when the Uplink (UL) synchronization is valid for the target cell. The UE could acquire SIB19 when the UL synchronization becomes invalid or lost for the target cell. The UE would know how to handle the validity duration for the serving cell.

In various embodiments, methods, systems, and apparatuses can comprise a UE receiving a system information including at least a first NTN configuration for a serving cell, starting or restarting a validity timer for the serving cell in response to receiving the system information, receiving a Radio Resource Control (RRC) reconfiguration message with ReconfigurationWithSync for a target cell, stopping, in response to receiving the RRC reconfiguration message, the validity timer that is running based on the first NTN configuration, and starting the validity timer based on a second NTN configuration for the target cell.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-201256, "Solutions for NR to support non-terrestrial networks (NTN)"; [2] 3GPP TR 38.821 V16.0.0, "Solutions for NR to support non-terrestrial networks (NTN)"; [3] R2-2206502, "Correction for NR NTN WI"; [4] R2-2206503, "Corrections to Release-17 NR Non-Terrestrial Networks (NTN)"; [5] 3GPP TS 38.331 V17.0.0, "NR, Radio Resource Control (RRC) protocol specification"; [6] 3GPP TS 38.300 V17.1.0, "NR and NG-RAN Overall Description, Stage 2"; and [7] 3GPP TS 38.331 V17.1.0, "NR, RRC protocol specification". The standards and documents listed above are hereby expressly and fully incorporated herein by reference in their entirety.

Figure 1:
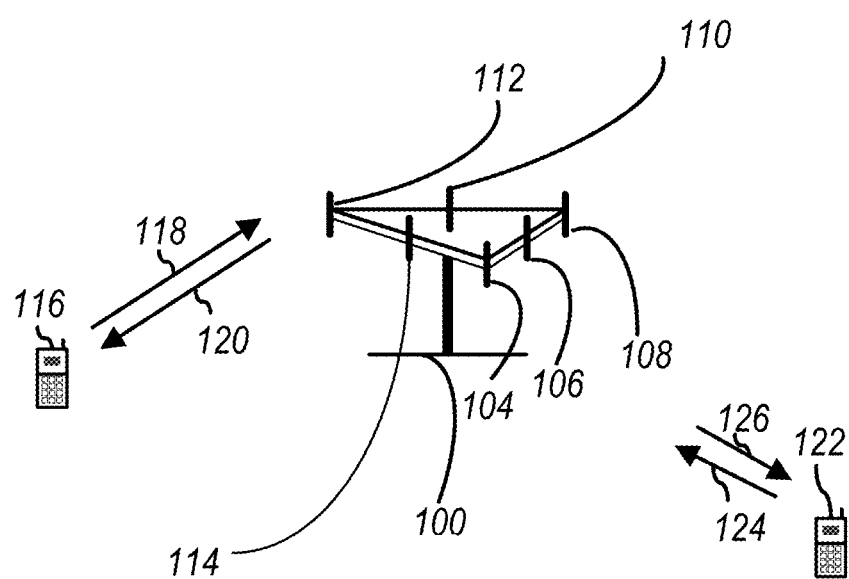
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
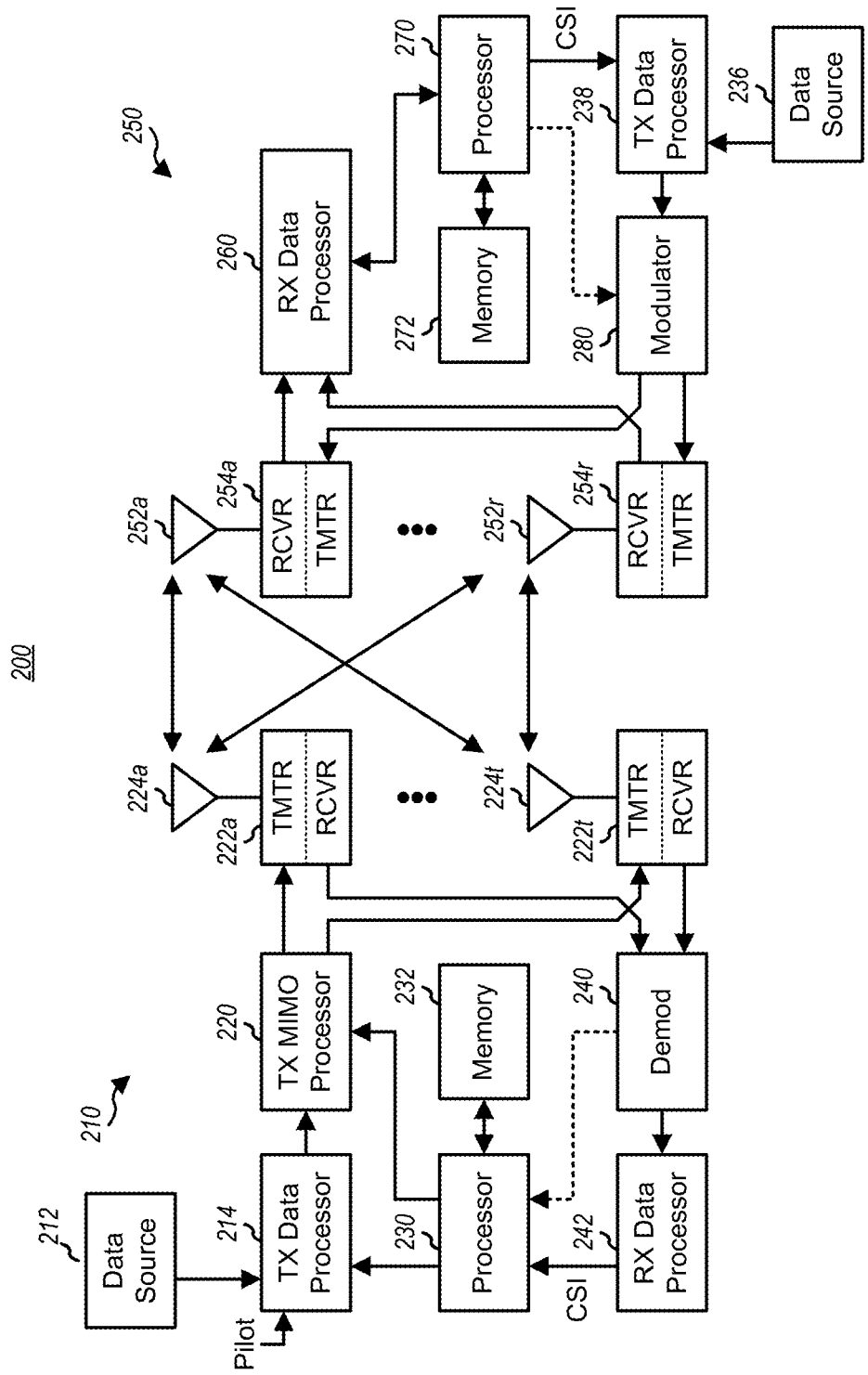
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
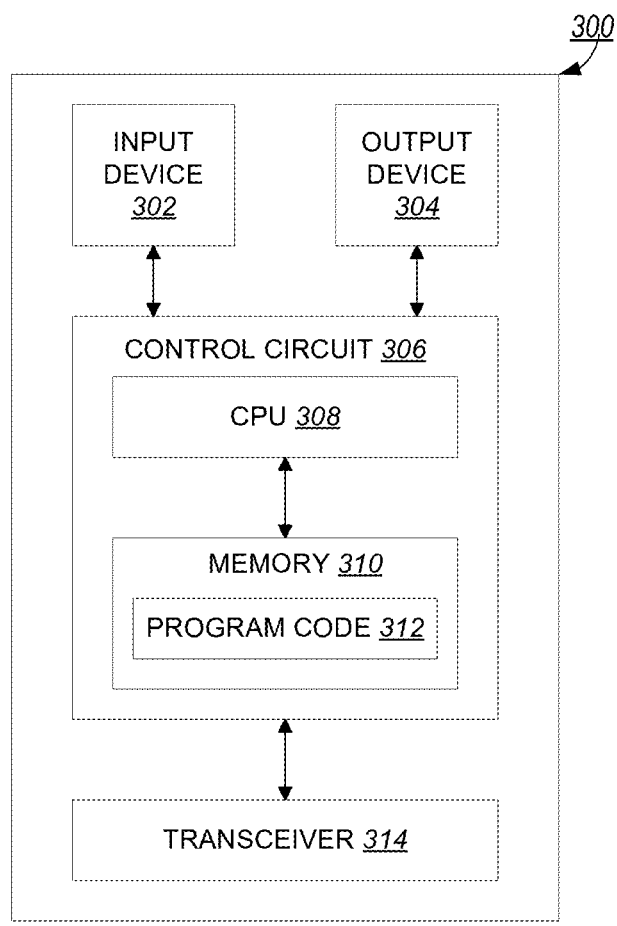
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
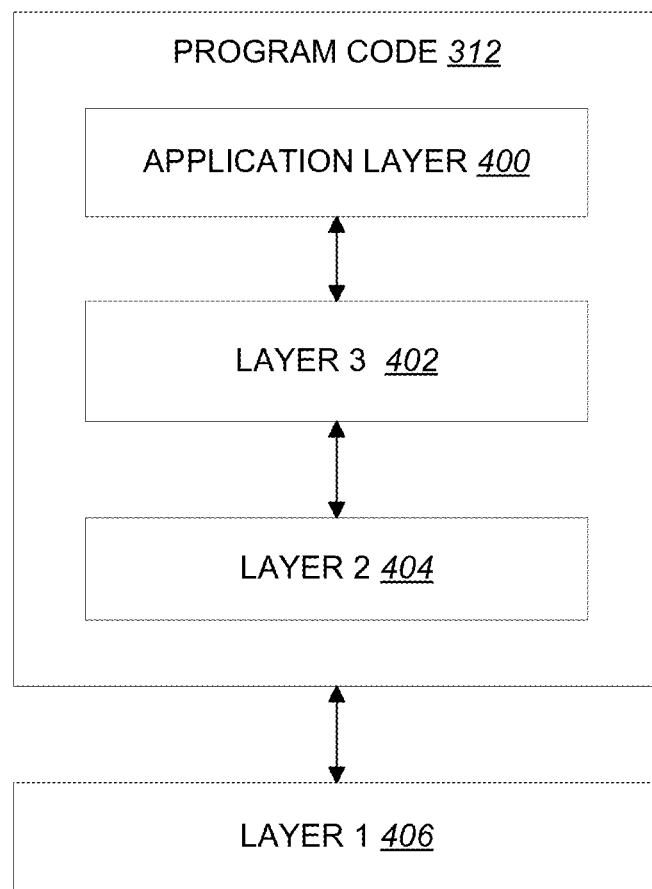
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The description of the Rel-17 work item of non-terrestrial networks (NTN) in NR is specified in [1] RP-201256, "Solutions for NR to support non-terrestrial networks (NTN)":

\* \* \* Quotation Start [1] \* \* \*

3 Justification

Non-terrestrial networks refer to networks, or segments of networks, using an airborne or spaceborne vehicle for transmission:

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

[ . . . ]

4 Objective 4.1 Objective of SI or Core part WI or Testing part WI

The work item aims to specify the enhancements identified for NR NTN (non-terrestrial networks) especially LEO and GEO with implicit compatibility to support HAPS (high altitude platform station) and ATG (air to ground) scenarios according to the following principles:

FDD is assumed for core specification work for NR-NTN.
        NOTE: This does not imply that TDD cannot be used for relevant scenarios e.g. HAPS, ATG
    Earth fixed Tracking area is assumed with Earth fixed and moving cells
    UEs with GNSS capabilities are assumed.
    Transparent payload is assumed \*\*\* Quotation End \*\*\*

The general description of Rel-17 NR non-terrestrial networks (NTN) is specified in [6] 3GPP TS 38.300 V17.1.0, "NR and NG-RAN Overall Description, Stage 2":

\*\*\* Quotation Start [6] \*\*\*

Figure 5:
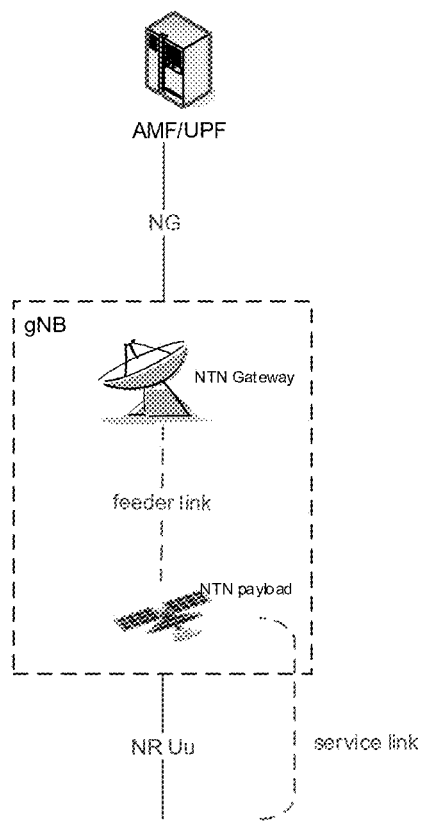
FIG. 5 is a reproduction of FIG. 16.14.1-1: Overall illustration of an NTN, from 3GPP TS 38.300 V17.1.0, "NR and NG-RAN Overall Description, Stage 2".
Figure 6:
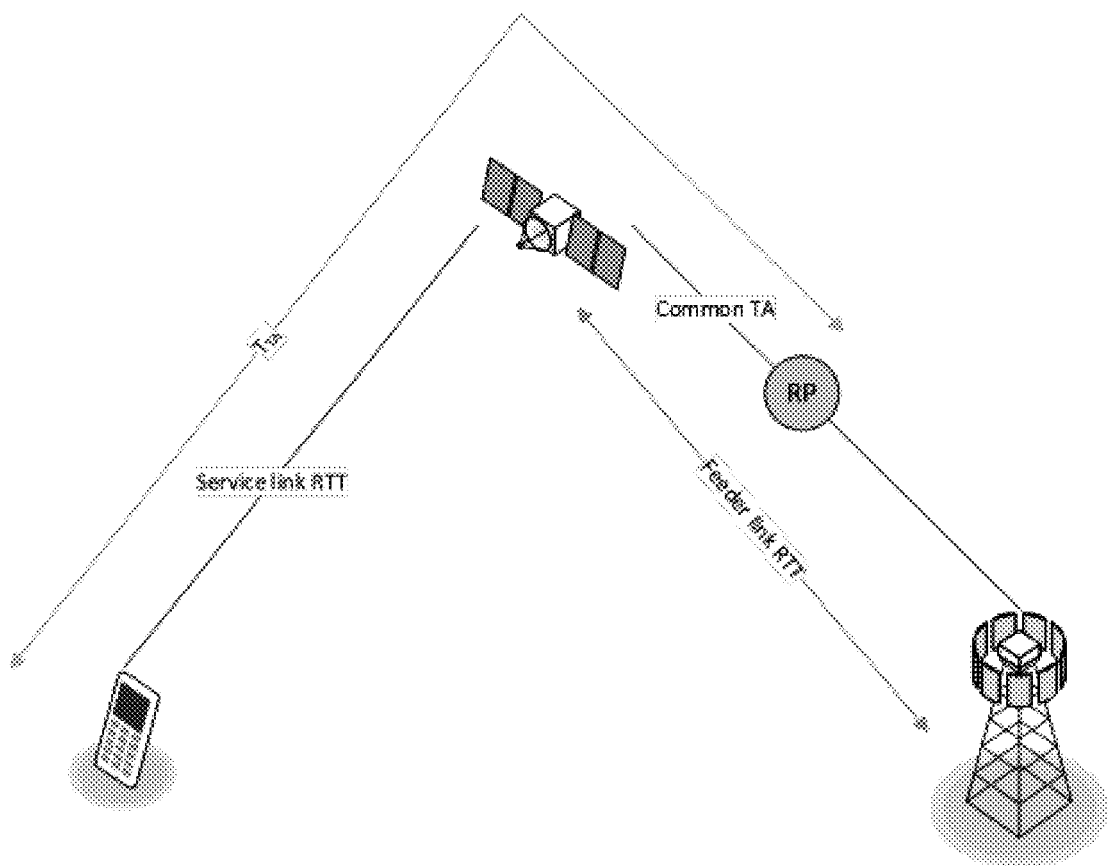
FIG. 6 is a reproduction of FIG. 16.14.2.1-1: Illustration of timing relationship, from 3GPP TS 38.300 V17.1.0, "NR and NG-RAN Overall Description, Stage 2".
Figure 16:
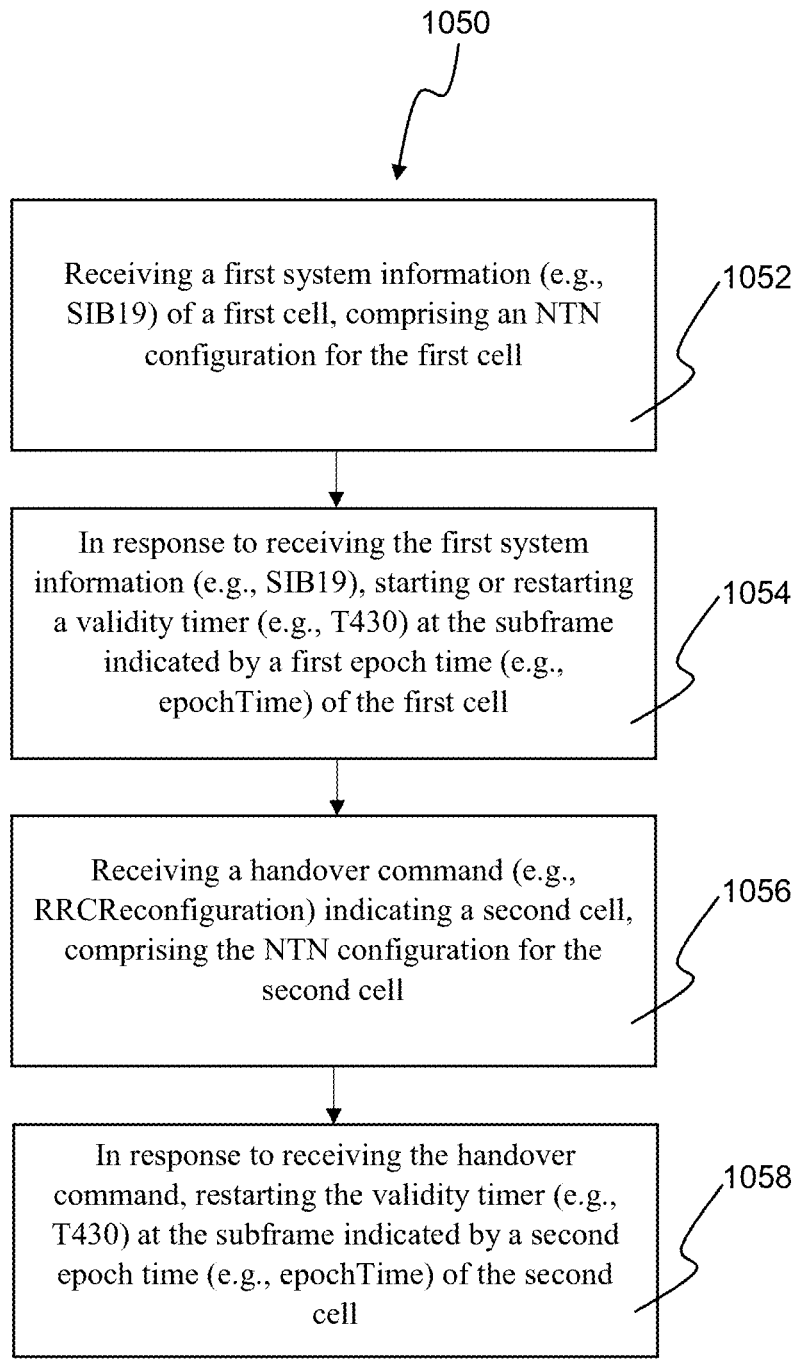
FIG. 16 is a flow diagram of a UE receiving a first system information of a first cell, starting or restarting a validity timer at the subframe indicated by a first epoch time of the first cell, receiving a handover command indicating a second cell, and restarting the validity timer at the subframe indicated by a second epoch time of the second cell, in accordance with embodiments of the present invention.

16.14 Non-Terrestrial Networks
16.14.1 Overview
The FIG. 16.14.1-1 below illustrates an example of a Non-Terrestrial Network (NTN) providing non-terrestrial NR access to the UE by means of an NTN payload and an NTN Gateway, depicting a service link between the NTN payload and a UE, and a feeder link between the NTN Gateway and the NTN payload.
FIG. 5 is a reproduction of FIG. 16.14.1-1: Overall illustration of an NTN, from 3GPP TS 38.300 V17.1.0, "NR and NG-RAN Overall Description, Stage 2".
NOTE 1: FIG. 16.14.1-1 illustrates an NTN; RAN4 aspects are out of scope.
The NTN payload transparently forwards the radio protocol received from the UE (via the service link) to the NTN Gateway (via the feeder link) and vice-versa. The following connectivity is supported by the NTN payload:
  A gNB may serve multiple NTN payloads;
  An NTN payload may be served by multiple gNBs.
  NOTE 2: In this release, the NTN-payload may change the carrier frequency, before re-transmitting it on the service link, and vice versa (respectively on the feeder link).
[ . . . ]Non-Geosynchronous orbit (NGSO) includes Low Earth Orbit at altitude approximately between 300 km and 1500 km and Medium Earth Orbit at altitude approximately between 7000 km and 25000 km.
Three types of service links are supported:
  Earth-fixed: provisioned by beam(s) continuously covering the same geographical areas all the time (e.g., the case of GSO satellites);
  Quasi-Earth-fixed: provisioned by beam(s) covering one geographic area for a limited period and a different geographic area during another period (e.g., the case of NGSO satellites generating steerable beams);
  Earth-moving: provisioned by beam(s) whose coverage area slides over the Earth surface (e.g., the case of NGSO satellites generating fixed or non-steerable beams).
With NGSO satellites, the gNB can provide either quasi-Earth-fixed cell coverage or Earth-moving cell coverage, while gNB operating with GSO satellite can provide Earth fixed cell coverage.
In this release, the UE supporting NTN is GNSS-capable.
In the case of NGSO, service link switch refers to a change of serving satellite.
The support for Non-Terrestrial Networks (NTNs) is facilitated by the mechanisms described in the following clauses.
16.14.2 Timing and Synchronization
16.14.2.1 Scheduling and Timing
DL and UL are frame aligned at the uplink time synchronization reference point (RP) with an offset given by $N_{TA, offset}$.
To accommodate the propagation delay in NTNs, several timing relationships are enhanced by a Common Timing Advance (Common TA) and two scheduling offsets $K_{offset}$ and $k_{mac}$ illustrated in FIG. 16.14.2.1-1:
  Common TA is a configured offset that corresponds to the RTT between the Reference Point (RP) and the NTN payload.
  $K_{offset}$ is a configured scheduling offset that approximately corresponds to the sum of the service link RTT and the common TA.
  $k_{mac}$ is a configured offset that approximately corresponds to the RTT between the RP and the gNB.
FIG. 6 is a reproduction of FIG. 16.14.2.1-1: Illustration of timing relationship, from 3GPP TS 38.300 V17.1.0, "NR and NG-RAN Overall Description, Stage 2".
16.14.2.2 Pre-compensation by the UE
For the serving cell, the network broadcast ephemeris information and common TA parameters. The UE should have valid GNSS position as well as the satellite ephemeris and common TA before connecting to an NTN cell. To achieve synchronisation, before and during connection to an NTN cell, the UE autonomously pre-compensates the TA ($T_{TA}$), see FIG. 16.14.2.2-1, as well as the frequency Doppler shift by considering the common TA, UE position and the satellite position through the satellite ephemeris.
[ . . . ]
16.14.3 Mobility and State transition
16.14.3.2 Mobility in RRC_CONNECTED
16.14.3.2.1 Handover
The same principle as described in 9.2.3.2 applies unless hereunder specified:
During mobility between NTN and Terrestrial Network, a UE is not required to connect to both NTN and Terrestrial Network at the same time.
  NOTE: NTN-Terrestrial Network hand-over refers to mobility in both directions, i.e. from NTN to Terrestrial Network (hand-in) and from Terrestrial Network to NTN (hand-out).
DAPS handover is not supported for NTN in this release of the specification.
UE may support mobility between radio access technologies based on different orbit (GSO, NGSO at different altitude).

\*\*\* Quotation End \*\*\*

The endorsed NR RRC CR for NTN is specified in R2-2206502 ([3] R2-2206502, "Correction for NR NTN WI") as provided below:

\*\*\* Quotation Start [3]\*\*\*

Figure 7:
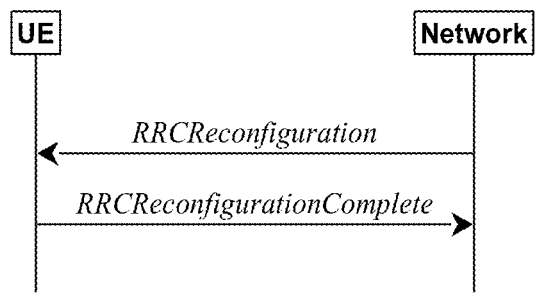
FIG. 7 is a reproduction of FIG. 5.3.5.1-1: RRC reconfiguration, successful, from R2-2206502, "Correction for NR NTN WI".
Figure 8:
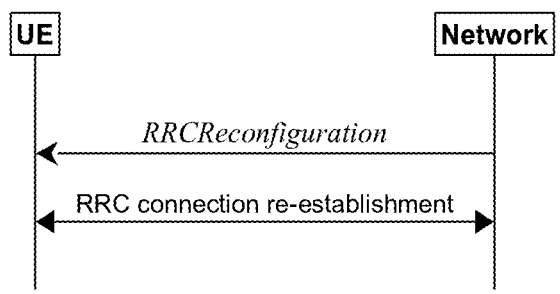
FIG. 8 is a reproduction of FIG. 5.3.5.1-2: RRC reconfiguration, failure, from R2-2206502, "Correction for NR NTN WI".

5.3.5 RRC reconfiguration
5.3.5.1 General
FIG. 7 is a reproduction of FIG. 5.3.5.1-1: RRC reconfiguration, successful, from R2-2206502, "Correction for NR NTN WI".
FIG. 8 is a reproduction of FIG. 5.3.5.1-2: RRC reconfiguration, failure, from R2-2206502, "Correction for NR NTN WI".
The purpose of this procedure is to modify an RRC connection, e.g. to establish/modify/release RBs/BH RLC channels, to perform reconfiguration with sync, to setup/modify/release measurements, to add/modify/release SCells and cell groups, to add/modify/release conditional handover configuration, to add/modify/release conditional PSCell change or conditional PSCell addition configuration. As part of the procedure, NAS dedicated information may be transferred from the Network to the UE.
[ . . . ]
5.3.5.2 Initiation
The Network may initiate the RRC reconfiguration procedure to a UE in RRC_CONNECTED. The Network applies the procedure as follows:
  [ . . . ]
  the reconfigurationWithSync is included in masterCell-Group only when AS security has been activated, and SRB2 with at least one DRB or multicast MRB or, for IAB, SRB2, are setup and not suspended;
    [ . . . ]
5.3.5.8.3 T304 expiry (Reconfiguration with sync Failure) or T420 expiry (Path switch failure)
The UE shall:
    1>if T304 of the MCG expires, or
    1>if T420 expires, or,
    1>if the target L2 U2N Relay UE changes its serving PCell before path switch (i.e. the received RRCReconfiguration message containing reconfigurationWithSync indicating path switch as specified in 5.3.5.5.2):
        2>release dedicated preambles provided in rach-ConfigDedicated if configured;
        2>release dedicated msgA PUSCH resources provided in rach-ConfigDedicated if configured;
        [ . . . ]
            3>revert back to the UE configuration used in the source PCell;
            3>if the associated T304 was not initiated upon cell selection performed while timer T311 was running, as defined in clause 5.3.7.3:
                4>store the handover failure information in VarRLF-Report as described in the clause 5.3.10.5;
            3>initiate the connection re-establishment procedure as specified in clause 5.3.7.
        [ . . . ]
    1>else if T304 expires when RRCReconfiguration is received via other RAT (HO to NR failure):
        2>reset MAC;
        2>perform the actions defined for this failure case as defined in the specifications applicable for the other RAT.
    NOTE 2: In this clause, the term 'handover failure' has been used to refer to 'reconfiguration with sync failure'.

\* \* \* Next Quotation \* \* \*

- RRCReconfiguration
The RRCReconfiguration message is the command to modify an RRC connection. It may convey information for measurement configuration, mobility control, radio resource configuration (including RBs, MAC main configuration and physical channel configuration) and AS security configuration.
Signalling radio bearer: SRB1 or SRB3
RLC-SAP: AM
Logical channel: DCCH
Direction: Network to UE

| RRCReconfiguration message |
| --- |
| [...]<br>RRCReconfiguration-v1530-IEs ::=   SEQUENCE {<br>    masterCellGroup                         OCTET STRING (CONTAINING CellGroupConfig)<br>        OPTIONAL, -- Need M<br>    fullConfig                              ENUMERATED {true}<br>        OPTIONAL, -- Cond FullConfig<br>    dedicatedNAS-MessageList                SEQUENCE (SIZE (1..maxDRB)) OF DedicatedNAS-Message<br>        OPTIONAL, -- Cond nonHO<br>    masterKeyUpdate                         MasterKeyUpdate<br>        OPTIONAL, -- Cond MasterKeyChange<br>    dedicatedSIB1-Delivery                  OCTET STRING (CONTAINING SIB1)<br>        OPTIONAL, -- Need N<br>    dedicatedSystemInformationDelivery      OCTET STRING (CONTAINING SystemInformation)<br>        OPTIONAL, -- Need N<br>    [...]<br>}<br>[...] |

| RRCReconfiguration-IEs field descriptions |
| --- |
| conditionalReconfiguration |
| Configuration of candidate target SpCell(s) and execution condition(s) for conditional handover, conditional PSCell addition or conditional PSCell change. The field is absent if any DAPS bearer is configured or if the masterCellGroup includes ReconfigurationWithSync. For conditional PSCell change, the field is absent if the secondaryCellGroup includes ReconfigurationWithSync. The RRCReconfiguration message contained in DLInformationTransferMRDC cannot contain the field conditionalReconfiguration for conditional PSCell change and conditional PSCell addition. |
| dedicatedSystemInformationDelivery |
| This field is used to transfer SIB6, SIB7, SIB8, SIB19 to the UE with an active BWP with no common serach space configured. For UEs in RRC_CONNECTED, this field is used to transfer the SIBs requested on-demand. |
| fullConfig |
| Indicates that the full configuration option is applicable for the RRCReconfiguration message for intra-system intra-RAT HO. For inter-RAT HO from E-UTRA to NR, fullConfig indicates whether or not delta signalling of SDAP/PDCP from source RAT is applicable. This field is absent if any DAPS bearer is configured or when the RRCReconfiguration message is transmitted on SRB3, and in an RRCReconfiguration message for SCG contained in another RRCReconfiguration message (or RRCConnectionReconfiguration message, see TS 36.331 [10]) transmitted on SRB1. |

[ ... ]
- RRCReconfigurationComplete
The RRCReconfigurationComplete message is used to confirm the successful completion of an RRC connection reconfiguration.

Signalling radio bearer: SRB1 or SRB3
   RLC-SAP: AM
   Logical channel: DCCH
   Direction: UE to Network

* * * Next Quotation * * *

- SIB19
SIB19 contains satellite assistance information.

- EphemerisInfo
The IE EphemerisInfo provides satellite ephemeris. Ephemeris may be expressed either in format of position and velocity state vector or in format of orbital parameters.

* * * Next Quotation * * *

- CellGroupConfig
The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

| SIB19 information element |
| --- |
| ```
SIB19-r17 ::= SEQUENCE {
    ntn-Config-r17              NTN-Config-r17              OPTIONAL, -- Need R
    t-Service-r17               INTEGER (0 .. 549755813887) OPTIONAL, -- Need R
    referenceLocation-r17       ReferenceLocation-r17       OPTIONAL, -- Need R
    distanceThresh-r17          INTEGER(0 .. 65525)         OPTIONAL, -- Need R
    ntn-NeighCellConfigList-r17 NTN-NeighCellConfigList-r17 OPTIONAL, -- Need R
    lateNonCriticalExtension    OCTET STRING                OPTIONAL,
    ...
}
NTN-NeighCellConfigList-r17 ::= SEQUENCE (SIZE (1. .maxCellNTN) ) OF NTN-NeighCellConfig-r17
NTN-NeighCellConfig-r17 ::= SEQUENCE {
    ntn-Config-r17   NTN-Config-r17   OPTIONAL, -- Need R
    carrierFreq-r17  ARFCN-ValueNR    OPTIONAL, -- Need R
    physCellId-r17   PhysCellId       OPTIONAL  -- Need R
}
``` |

| SIB19 field descriptions |
| --- |
| distanceThresh |
| Distance from the serving cell reference location and is used in location-based measurement initiation in RRC_IDLE and RRC_INACTIVE, as defined in TS 38.304 [20]. Each step represents 50 m. |
| ntn-Config |
| Provides parameters needed for the UE to access NR via NTN access such as Ephemeris data, common TA parameters, k_offset, validity duration for UL sync information and epoch time . The validity duration, ntn-UlSyncValidityDuration, is mandatory present. |
| ntn-NeighCellConfigList |
| Provides a list of NTN neighbour cells including their ntn-Config, carrier frequency and PhysCellId. |
| referenceLocation |
| Reference location of the serving cell provided via NTN quasi-Earth fixed system and is used in location-based measurement initiation in RRC_IDLE and RRC_INACTIVE, as defined in TS 38.304 [20]. |
| t-Service |
| Indicates the time information on when a cell provided via NTN quasi-Earth fixed system is going to stop serving the area it is currently covering. The field indicates a time in multiples of 10 ms after 00:00:00 on Gregorian calendar date 1 Jan. 1900 (midnight between Sunday, Dec. 31, 1899 and Monday, Jan. 1, 1900). This field is excluded when determining changes in system information, i.e. changes of t-Service should neither result in system information change notifications nor in a modification of valueTag in SIB1. The exact stop time is between the time indicated by the value of this field minus 1 and the time indicated by the value of this field. |

***********************************Next Quotation*******************************************

| CellGroupConfig information element |
|---|
| ```
CellGroupConfig ::=            SEQUENCE {
  cellGroupId                    CellGroupId,
  [...]
  mac-CellGroupConfig            MAC-CellGroupConfig
OPTIONAL, -- Need M
  physicalCellGroupConfig        PhysicalCellGroupConfig
OPTIONAL, -- Need M
  spCellConfig                   SpCellConfig
OPTIONAL, -- Need M
  [...]
}
SpCellConfig ::=               SEQUENCE {
  servCellIndex                  ServCellIndex
OPTIONAL, -- Cond SCG
  reconfigurationWithSync        ReconfigurationWithSync
OPTIONAL, -- Cond ReconfWithSync
  [...]
}
ReconfigurationWithSync ::=    SEQUENCE {
  spCellConfigCommon             ServingCellConfigCommon
OPTIONAL, -- Need M
  newUE-Identity                 RNTI-Value,
  t304                           ENUMERATED {ms50, ms100, ms150, ms200,
ms500, ms1000, ms2000, ms 10000},
  rach-ConfigDedicated           CHOICE {
    uplink                         RACH-ConfigDedicated,
    supplementaryUplink            RACH-ConfigDedicated
  }
OPTIONAL, -- Need N
  ...,
  smtc                           SSB-MTC
OPTIONAL -- Need S
  [...]
}
[...]
``` |

| CellGroupConfig field descriptions |
|---|
| spCellConfig |
| Parameters for the SpCell of this cell group (PCell of MCG or PSCell of SCG). |

| SpCellConfig field descriptions |
|---|
| reconfiguration WithSync |
| Parameters for the synchronous reconfiguration to the target SpCell. |
| servCellIndex |
| Serving cell ID of a PSCell. The PCell of the Master Cell Group uses ID = 0. |

| Conditional Presence | Explanation |
|---|---|
| ReconfWithSync | The field is mandatory present in the RRCReconfiguration message:<br>in each configured CellGroupConfig for which the SpCell changes,<br>in the masterCellGroup:<br>at change of AS security key derived from $K_{gNB}$,<br>in an RRCReconfiguration message contained in a DLInformationTransferMRDC message,<br>path switch to the target PCell for a L2 U2N Remote UE,<br>path switch to the target L2 U2N Relay UE,<br>in the secondaryCellGroup at:<br>PSCell addition,<br>SCG resume with NR-DC or (NG)EN-DC,<br>update of required SI for PSCell, |

| Conditional Presence | Explanation |
| --- | --- |
| | change of AS security key derived from S-K$_{gNB}$ in NR-DC while the UE is configured with at least one radio bearer with keyToUse set to secondary and that is not released by this RRCReconfiguration message, MN handover in (NG)EN-DC. Otherwise, it is optionally present, need M. The field is absent in the masterCellGroup in RRCResume and RRCSetup messages and is absent in the masterCellGroup in RRCReconfiguration messages if source configuration is not released during DAPS handover. |

*****************************************Next Quotation*****************************************

- NTN-Config

The IE NTN-Config provides parameters needed for the UE to access NR via NTN access.

NTN-Config information element

```
NTN-Config-r17 ::=              SEQUENCE {
    epochTime-r17                   EpochTime-r17
OPTIONAL, -- Need R
    ntn-UlSyncValidityDuration-r17  ENUMERATED{ s5, s10, s15, s20, s25, s30, s35,
                                    s40, s45, s50, s55, s60, s120, s180, s240, s900}
OPTIONAL, -- Need R
    cellSpecifickoffset-r17         INTEGER (1 . . 1023)
OPTIONAL, -- Need R
    kmac-r17                        INTEGER (1 . . 512)
OPTIONAL, -- Need R
    ta-Info-r17                     TA-Info-r17
OPTIONAL, -- Need R
    ntn-PolarizationDL-r17          ENUMERATED {rhcp, lhcp, linear}
OPTIONAL, -- Need R
    ntn-PolarizationUL-r17          ENUMERATED {rhcp, lhcp, linear}
OPTIONAL, -- Need R
    ephemerisInfo-r17               EphemerisInfo-r17
OPTIONAL, -- Need R
    ta-Report-r17                   ENUMERATED {enabled}
OPTIONAL -- Need R
}
EpochTime-r17 : :=              SEQUENCE {
    sfn-r17                         INTEGER (0 . . 1023),
    subFrameNR-r17                  INTEGER (0 . . 9)
}
TA-Info-r17 ::=                 SEQUENCE {
    ta-Common-r17                   INTEGER (0 . . 66485757),
    ta-CommonDrift-r17              INTEGER (-257303. . 257303)
OPTIONAL, -- Need R
    ta-CommonDriftVariant-r17       INTEGER (0. . 28949)
OPTIONAL, -- Need R
}
```

NTN-Config field descriptions

EphemerisInfo

This field provides satellite ephemeris either in format of position and velocity state vector or in format of orbital parameters. This field is excluded when determining changes in system information, i.e. changes of XXX should neither result in system information change notifications nor in a modification of valueTag in SIB1.

epochTime

Indicate the epoch time for assistance information (i.e. Serving satellite ephemeris in IE ephemerisInfo and Common TA parameters). When explicitly provided through SIB, or through dedicated signaling, EpochTime is the starting time of a DL sub-frame, indicated by a SFN and a sub-frame number signaled together with the assistance information. The reference point for epoch time of the serving satellite ephemeris and Common TA parameters is the uplink time synchronization reference point. If this field is absent, the epoch time is the end of SI window where this SIB19 is scheduled. This field is mandatory present when provided in dedicated configuration. If this field is absent in ntn-Config provided via NTN-NeighCellConfig the UE uses epoch time from the serving satellite ephemeris. In case of handover, this field is based on the timing of the target cell, i.e. the SFN and sub-frame number indicated in this field refers to the SFN and sub-frame of the target cell. This field is excluded when determining changes in system information, i.e. changes of epochTime should neither result in system information change notifications nor in a modification of valueTag in SIB1.

| NTN-Config field descriptions |
|---|
| cellSpecificKoffset |
| The CellSpecific_K_offset is a scheduling offset used for the timing relationships that need to be modified for NTN [see TS 38.2xy]. The unit of K_offset is number of slots for a given subcarrier spacing of 15 kHz. If the field is absent UE assumes value 0. |
| kmac |
| K_mac is a scheduling offset provided by network if downlink and uplink frame timing are not aligned at gNB. It is needed for UE action and assumption on downlink configuration indicated by a MAC-CE command in PDSCH [see TS 38.2xy]. If the field is absent UE assumes value 0.<br>For the reference subcarrier spacing value for the unit of K_mac in FR1, a value of 15 kHz is used. The unit of K_mac is number of slots for a given subcarrier spacing.<br>ntn-PolarizationDL |
| If present, this parameter indicates polarization information for Downlink transmission on service link: including Right hand, Left hand circular polarizations (RHCP, LHCP) and Linear polarization.<br>ntn-PolarizationUL |
| If present, this parameter indicates Polarization information for Uplink service link.<br>If not present and ntnPolarizationDL is present, UE assumes a same polarization for UL and DL.<br>ntn-UlSyncValidityDuration |
| A validity duration configured by the network for uplink synchronization assistance information (i.e. Serving satellite ephemeris and Common TA parameters) which indicates the maximum time during which the UE can apply assistance information without having acquired new assistance information.<br>The unit of ntn-UlSyncValidityDuration is second. This parameter applies to both connected and idle mode UEs. This field is excluded when determining changes in system information, i.e. changes of ntn-UlSyncValidityDuration should neither result in system information change notifications nor in a modification of value Tag in SIB1. ntn-UlSyncValidityDuration is only updated when at least one of epochTime, ta-Info, ephemerisInfo is updated.<br>ta-Common |
| TACommon is a network-controlled common timing advanced value and it may include any timing offset considered necessary by the network. TACommon with value of 0 is supported. The granularity of TACommon is $4.072 \times 10^{-3}$ μs. Values are given in unit of corresponding granularity. This field is excluded when determining changes in system information, i.e. changes of ta-Common should neither result in system information change notifications nor in a modification of value Tag in SIB1.<br>ta-CommonDrift |
| Indicate drift rate of the common TA. The granularity of TACommonDrift is $0.2 \times 10^{-3}$ μs/s Values are given in unit of corresponding granularity. This field is excluded when determining changes in system information, i.e. changes of ta-CommonDrift should neither result in system information change notifications nor in a modification of valueTag in SIB1.<br>ta-CommonDriftVariant |
| Indicate drift rate variation of the common TA. The granularity of TACommonDriftVariation is $0.2 \times 10^{-4}$ μs/s^2. Values are given in unit of corresponding granularity. This field is excluded when determining changes in system information, i.e. changes of ta-CommonDriftVariant should neither result in system information change notifications nor in a modification of value Tag in SIB1._<br>ta-Report |
| When this field is included in SIB19, it indicates TA reporting is enabled during Random Access due to RRC connection establishment, RRC connection reestablishment and RRC connection resume. When this field is included in ServingCellConfigCommon within dedicated signalling, it indicates TA reporting is enabled during Random Access due to reconfiguration with sync (see TS 38.321 [3], clause x.x.x). |

*****************************************Next Quotation*******************************************

* * * Next Quotation * * *

- ServingCellConfigCommon
The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

| ServingCellConfigCommon information element | |
|---|---|
| ServingCellConfigCommon : := | SEQUENCE { |
| physCellId | PhysCellId |
| OPTIONAL, -- Cond HOAndServCellAdd, | |
| downlinkConfigCommon | DownlinkConfigCommon |
| OPTIONAL, -- Cond HOAndServCellAdd | |
| uplinkConfigCommon | UplinkConfigCommon |
| OPTIONAL, -- Need M | |
| supplementaryUplinkConfig | UplinkConfigCommon |

| ServingCellConfigCommon information element |
|---|
| OPTIONAL, -- Need S<br>[ ... ]<br>   ntn-Config-r17                  NTN-Config-r17        OPTIONAL -- Need R<br>} |

\*\*\*\*\*\*\*\*\*\*\*\*\*\*\*\*\*\*\*\*\*\*\*\*\*\*\*\*\*\*\*\*\*Quotation End\*\*\*\*\*\*\*\*\*\*\*\*\*\*\*\*\*\*\*\*\*\*\*\*\*\*\*\*\*\*\*

The validity timer (e.g., T430) handling is specified in TS 38.331 V17.1.0 ([7] 3GPP TS 38.331 V17.1.0, "NR, RRC protocol specification") as provided below.

\* \* \* Quotation Start [7] \* \* \*

5.2.2.4.21 Actions upon reception of SIB19
Upon receiving SIB19, the UE shall:
   1>start or restart T430 with the duration ntn-UlSyncValidityDuration from the subframe indicated by epochTime;
   NOTE: UE should attempt to re-acquire SIB19 before the end of the duration indicated by ntn-UlSyncValidityDuration and epochTime by UE implementation.

\* \* \* Next Quotation \* \* \*

5.2.2.6 T430 expiry
The UE shall:
   1>if in RRC_CONNECTED:
      2>inform lower layers that UL synchronisation is lost;
      2>acquire SIB19 as defined in clause 5.2.2.3.2;
      2>upon successful acquisition of SIB19:
         3>inform lower layers that UL synchronisation is obtained;

\* \* \* Quotation End \* \* \*

The endorsed NR MAC CR for NTN is specified in R2-2206503 ([4] R2-2206503, "Corrections to Release-17 NR Non-Terrestrial Networks (NTN)") as provided below:

\* \* \* Quotation Start [4] \* \* \*

5.2a Maintenance of UL Synchronization
The MAC entity shall:
   1>if an indication of Serving Cell uplink synchronization has been received from upper layers (see clause 5.2.2.X of TS 38.331 [5]):
      2>allow uplink transmission on the corresponding Serving Cell.
   1>if an indication of Serving Cell uplink synchronization loss is received from upper layers:
      2>flush all HARQ buffers;
      2>not perform any uplink transmission on the corresponding Serving Cell. \* \* \* Quotation End \* \* \*

The RRC reconfiguration (e.g., handover) procedure is specified in TS 38.331([7] 3GPP TS 38.331 V17.1.0, "NR, RRC protocol specification") as provided below:

\* \* \* Quotation Start [7] \* \* \*

5.3.5.3 Reception of an RRCReconfiguration by the UE
The UE shall perform the following actions upon reception of the RRCReconfiguration, or upon execution of the conditional reconfiguration (CHO, CPA or CPC):
   [ . . . ]
   1>if the RRCReconfiguration includes the masterCellGroup:
      2>perform the cell group configuration for the received masterCellGroup according to 5.3.5.5;
   [ . . . ]
   1>if reconfigurationWithSync was included in spCellConfig of an MCG or SCG:
      [ . . . ]
      3>when MAC of an NR cell group successfully completes a Random Access procedure triggered above:
         3>stop timer T304 for that cell group;
      2>stop timer T310 for source SpCell if running;
      2>apply the parts of the CSI reporting configuration, the scheduling request configuration and the sounding RS configuration that do not require the UE to know the SFN of the respective target SpCell, if any;
      2>apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
   [ . . . ]

5.3.5.5 Cell Group configuration
5.3.5.5.1 General
The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:
   1>if the CellGroupConfig contains the spCellConfig with reconfigurationWithSync:
      2>perform Reconfiguration with sync according to 5.3.5.5.2;
      2>resume all suspended radio bearers except the SRBs for the source cell group, and resume SCG transmission for all radio bearers, and resume BH RLC channels and resume SCG transmission for BH RLC channels for IAB-MT, if suspended;
   [ . . . ]

5.3.5.5.2 Reconfiguration with sync

The UE shall perform the following actions to execute a reconfiguration with sync.

[ . . . ]
- 2>if this procedure is executed for the MCG or if this procedure is executed for an SCG not indicated as deactivated in the E-UTRA or NR RRC message in which the RRCReconfiguration message is embedded:
  - 3>start timer T304 for the corresponding SpCell with the timer value set to t304, as included in the reconfigurationWithSync;

[ . . . ]
- 2>start synchronising to the DL of the target SpCell;
- 2>if ta-Report is configured with value enabled and the UE supports TA reporting;
  - 3>indicate TA report initiation to lower layers;
- 2>apply the specified BCCH configuration defined in 9.1.1.1 for the target SpCell;
- 2>acquire the MIB of the target SpCell, which is scheduled as specified in TS 38.213 [13];

[ . . . ]
- 3>reset the MAC entity of this cell group;
- 3>consider the SCell(s) of this cell group, if configured, that are not included in the SCellToAddModList in the RRCReconfiguration message, to be in deactivated state;
- 3>apply the value of the newUE-Identity as the C-RNTI for this cell group;
- 3>configure lower layers in accordance with the received spCellConfigCommon;
- 3>configure lower layers in accordance with any additional fields, not covered in the previous, if included in the received reconfigurationWithSync.

\* \* \* Quotation End \* \* \*

In addition, the following agreements have also been reached in the past 3GPP RAN2 meetings. The SIBx or SIBxx could be SIB19 as specified in [7] 3GPP TS 38.331 V17.1.0, "NR, RRC protocol specification". The T3XX could be T430 as specified in 3GPP TS 38.331 V17.1.0.

In RAN2 #116bis:
  Introduce the following serving cell information to the corresponding SIBx (scheduled by SIB1): ephemeris; common TA parameters; validity duration for UL sync information; t-Service; cell reference location; epoch time. Also send a LS to RAN1 asking whether some parameters might be sent more frequently.

In RAN2 #117:
  The validity timer information for neighbor cell's ephemeris information should be introduced in system information and it can be the same as or different from the validity timer of the serving cell;
  ntnUlSyncValidityDuration applies both to connected mode and idle mode;
  The following NOTE is captured: "UE should attempt to re-acquire SIBxx prior to validity timer expiry by UE implementation." Details of NOTE (potentially including additional clarification if needed) may be finalized in Stage 3. This is captured in RRC specification (e.g. Section 5.2.2.x);
  RAN2 clarifies that Epoch time applies only to Ephemeris parameters and common TA parameters and ntnUlSyncValidityDuration is started at Epoch time.

In RAN2 #118:
  Upon validity timer expiry in NR NTN, UE shall suspend uplink transmission and acquire SIB19, flushing HARQ buffers;
  A new T3XX timer is introduced in RRC specification with duration ntn-UlSyncValidityDuration;
  RRC indicates to lower layers when T3XX timer has expired or is restarted.
  Ephemeris, common TA parameters, epoch time and validity duration can be updated without invoking the SI modification procedure;
  Regarding ephemeris, common TA parameters, epoch time and validity duration, UE considers the parameters as valid during validity duration, but the NW is not prevented from triggering the SI modification if there are major changes. No spec impact is introduced. RAN2 understands that the NW should not change validity duration alone;
  Common TA parameters and Kmac of the neighbor cell are used to support IDLE/Inactive UEs in NTN to perform SMTC adjustments.

A Non-terrestrial network (NTN) is defined as a Next-Generation Radio Access Network (NG-RAN) consisting of gNBs, which provides non-terrestrial access to User Equipment (UE) by means of an NTN payload embarked on an airborne or space-borne NTN vehicle and an NTN Gateway (e.g., [1] RP-201256, "Solutions for NR to support non-terrestrial networks (NTN)"). The UE may link to, camp on and/or connect to the NTN network that involves airborne/spaceborne for transmission. The NTN may comprise various platforms, including low earth orbit (LEO) satellite, medium earth orbit (MEO) satellite, highly elliptical orbit (HEO) satellite, geostationary earth orbit (GEO) satellite, geostationary synchronous Orbit (GSO) satellite, non-geostationary synchronous orbit (NGSO) satellite and/or high altitude platform station (HAPS). A LEO satellite could have earth-fixed beam (e.g., the beam is temporarily fixed on a location during a time period) or earth-moving beam (e.g., the beam is continuously moving along with the satellite). A LEO satellite could serve/provide earth moving cells (e.g., with earth-fixed beam) and/or (quasi-)earth fixed cells (e.g., with earth-moving beam). The NTN could offer a wide-area coverage and provide Network (NW) access in the scenario when terrestrial networks (TN) is unfeasible (e.g., desert, polar area, and/or on an airplane). More details regarding different NTN platforms could be found in TR 38.821 (e.g., [2] 3GPP TR 38.821 V16.0.0, "Solutions for NR to support non-terrestrial networks (NTN)").

As shown in FIG. 6 (FIG. 16.14.2.1-1 in [6] 3GPP TS 38.300 V17.1.0, "NR and NG-RAN Overall Description, Stage 2"), the UE would pre-compensate Timing Advance (TA) (e.g., with common TA and satellite ephemeris) to achieve Uplink (UL) synchronization in NTN. According to the agreements made by 3GPP RAN2, a validity duration for UL synchronization (e.g., ntn-UlSyncValidityDuration) of the serving cell is introduced in System Information Block 19 (SIB19). And the UE acquires an updated SIB19 when the timer expires. According to endorsed NTN RRC CR ([3] R2-2206502, "Correction for NR NTN WI") after 3GPP RAN2 #118 meeting, the NW could provide NTN configuration to the UE via system information and/or dedicated Radio Resource Control (RRC) message (e.g., RRCReconfiguration). The endorsed Change Request (CR) ([3] R2-2206502, "Correction for NR NTN WI") is a running CR which is going to combined into current specification (e.g., [5] TS 38.331 V17.0.0, "NR, Radio Resource Control (RRC) protocol specification"). The (content of) endorsed RRC CR ([3] R2-2206502, "Correction for NR NTN WI")

is added/combined into the specification in TS 38.331 V17.1.0. The NW could provide NTN configuration for the serving cell and neighbor cell(s) via an NTN-specific system information (e.g., SIB19) to the UE. The UE may acquire/receive the NTN-specific system information (e.g., SIB19) with an NTN configuration for the serving cell and NTN configurations (e.g., NTN-Config) for corresponding neighbor cells. The neighbor cells and corresponding NTN configurations (e.g., NTN-Config) may be indicated in a list (e.g., NTN-NeighCellConfigList) in the NTN-specific system information (e.g., SIB19). The NW could provide NTN configuration for target cell via RRC Reconfiguration message to the UE. The NTN configuration may be or comprise (satellite) assistance information. The NTN configuration and/or (satellite) assistance information may be or comprise (at least) epoch time (e.g., epochTime), validity duration, satellite ephemeris information (e.g., ephemerisInfo), and/or parameters for (common) TA (e.g., ta-Info, cellSpecificKoffset, kmac). The NTN configuration may be used by the UE in RRC connected mode, RRC idle mode, and/or RRC inactive mode. The UE could use the NTN configuration to access the serving cell, adjust/compensate TA, and/or perform measurement on one or more neighbor cell.

Throughout the disclosure, the NTN configuration may be NTN-Config, the RRC Reconfiguration message may be RRCReconfiguration, and the validity duration may be ntn-UlSyncValidityDuration.

The UE would apply the satellite ephemeris information (e.g., ephemerisInfo) and/or parameters for (common) TA (e.g., ta-Info) to perform TA pre-compensation, e.g., for serving cell, for target cell. The UE would apply the parameters for (common) TA (e.g., ta-Info, cellSpecificKoffset, kmac) to perform UL and/or Downlink (DL) transmission, e.g., for serving cell, for target cell. The UE would apply the epoch time (e.g., epochTime), satellite ephemeris information (e.g., ephemerisInfo) and/or parameters for (common) TA (e.g., ta-Info) to perform intra-frequency, cell reselection, and/or SMTC adjustment, e.g., for neighbor cell(s). The UE would apply the epoch time (e.g., epochTime) and/or validity duration to perform and/or evaluate UL synchronization, e.g., for serving cell, for neighbor cell(s), for target cell.

According to endorsed NTN RRC CR (e.g., [3] R2-2206502, "Correction for NR NTN WI") and MAC CR (e.g., [4] R2-2206503, "Corrections to Release-17 NR Non-Terrestrial Networks (NTN)"), upon receiving SIB19, the UE would (re)start a validity timer (e.g., T430 in [7] 3GPP TS 38.331 V17.1.0) with the validity duration from the subframe indicated by the epoch time (e.g., epochTime), e.g., based on an NTN configuration of the serving cell. The UE would apply the validity duration (e.g., in the NTN configuration of the serving cell) as the length of the validity timer. The validity duration may indicate the maximum time during which the UE can apply the (satellite) assistance information (e.g., for the serving cell) without having acquired new assistance information. The validity duration and/or validity timer (e.g., T430) (e.g., for the serving cell) may indicate the time duration when the satellite information or part of the satellite information (e.g., ephemerisInfo, ta-Info) is valid (e.g., for the serving cell). For example, when the validity timer (e.g., for the serving cell) is running, the (part of) satellite information may be considered as valid (e.g., for the serving cell). When the validity timer (e.g., for the serving cell) is not running, the (part of) satellite information may be considered as not valid (e.g., for the serving cell). The UE would apply the epoch time (e.g., epochTime) (e.g., in the NTN configuration of the serving cell) as the start timing of the validity timer after/upon receiving SIB19 (e.g., for the serving cell). Upon, after, and/or before the validity timer expiration, the UE may acquire SIB19. Upon the validity timer expiration, the UE may consider uplink synchronization is lost. In response to acquiring SIB19, the UE may consider uplink synchronization is obtained. If uplink synchronization is considered as lost, the UE may flush the Hybrid Automatic Repeat Request (HARQ) buffers and may not perform UL transmission on the serving cell. If uplink synchronization is considered (as obtained), the UE may perform UL transmission on the serving cell. When the validity timer is running, the corresponding serving cell may be considered uplink synchronization (e.g., uplink synchronization is obtained) in RRC connected mode. When the validity timer is not running and/or expires, the corresponding serving cell may be considered not uplink synchronization (e.g., uplink synchronization is lost) in RRC connected mode.

The UE may handle a single validity timer for the serving cell and/or the neighbor cell(s). The UE may receive/acquire SIB19 with an NTN configuration for the serving cell and/or NTN configuration(s) (e.g., NTN-Config) for neighbor cell(s), comprising validity duration(s) (e.g., ntn-UlSyncValidityDuration) and/or epoch time(s) (e.g., epochTime). Upon receiving/acquiring SIB19, the UE may start the validity timer with a specific validity duration from the subframe indicated by a specific epoch time (e.g., epochTime).

The UE may handle a first validity timer for the serving cell and/or handle a second validity timer for the neighbor cell(s). The UE may receive/acquire SIB19 with an NTN configuration for the serving cell comprising a first validity duration and a first epoch time (e.g., epochTime). The UE may receive/acquire SIB19 with NTN configuration(s) (e.g., NTN-Config) for neighbor cell(s) comprising second validity duration(s) (e.g., ntn-UlSyncValidityDuration) and/or second epoch time(s) (e.g., epochTime). Upon receiving/acquiring SIB19, the UE may start the first validity timer with the first validity duration from the subframe indicated by the first epoch time (e.g., epochTime). Upon receiving/acquiring SIB19, the UE may start the second validity timer with a specific second validity duration from the subframe indicated by a specific second epoch time (e.g., epochTime).

The UE may handle a first validity timer for the serving cell and/or multiple second validity timers for (corresponding) neighbor cells indicated in SIB19. The UE may receive/acquire SIB19 with an NTN configuration for the serving cell comprising a first validity duration and a first epoch time (e.g., epochTime). The UE may receive/acquire SIB19 with multiple NTN configurations (e.g., NTN-Config) for neighbor cell(s) comprising multiple second validity durations (e.g., ntn-UlSyncValidityDuration) and/or second epoch times (e.g., epochTime). Upon receiving/acquiring SIB19, the UE may start the first validity timer with the first validity duration from the subframe indicated by the first epoch time (e.g., epochTime). Upon receiving/acquiring SIB19, the UE may start each second validity timer with the corresponding second validity duration from the subframe indicated by the corresponding second epoch time (e.g., epochTime).

Throughout the disclosure, the (serving/neighbor/source/target) cell may be (referred to) an NTN cell. The serving cell may be a serving cell indicated in (or associated to) SIB19, associated to NTN configuration, and/or configured with (satellite) assistance information. The serving cell may be a source cell during/before a handover procedure. The neighbor cell may be a neighbor cell indicated in SIB19, associated to NTN configuration, and/or configured with (satellite) assistance information. The neighbor cell may be a cell neighbor to the serving cell. The source cell may be the (current) serving cell of the UE. The target cell may be indicated by the NW in a handover command/RRC reconfiguration message (e.g., RRCReconfiguration).

Throughout the disclosure, SIB19 may be a system information for the serving cell. SIB19 may be an NTN-specific system information. SIB19 may contain satellite assistance information. SIB19 may contain UL synchronization information for NTN (e.g. NTN configuration, (satellite) assistance information). SIB19 may be broadcast to the UEs in an NTN cell. The system information may be referred to as a system information block.

The NW could handover a UE from a source cell (e.g., (current) serving cell) to a target cell, e.g., based on measurement results of the serving cell, neighbor cell(s), beam(s), and/or non-serving cell on a frequency. If the NW would like to handover a UE to a target cell, the NW could transmit a handover command/RRC reconfiguration message (e.g., RRCReconfiguration including ReconfigurationWithsync) to the UE indicating the target cell and providing configuration of the target cell. The NW could provide an NTN configuration for the target cell in the handover command/RRC Reconfiguration message. The NW could not provide an NTN configuration for the target cell in the handover command/RRC Reconfiguration message. In response to receiving the handover command/RRC Reconfiguration message, the UE would trigger a handover procedure to access the target cell and transmit an RRC response message (e.g., RRCReconfigurationComplete) to the NW. The UE could use NTN configuration including in the RRC Reconfiguration message to access the target cell. The UE could (re)use NTN configuration (e.g., of a neighbor cell) including in a system information (e.g., SIB19 of serving cell) to access the target cell, e.g., if the NTN configuration is not provided in the RRC Reconfiguration message. The UE would use the NTN configuration to perform TA pre-compensation and/or UL synchronization for the target cell.

The handover may be an NTN-NTN handover (e.g., from an NTN cell to an NTN cell). The handover may be from a LEO cell to a LEO cell. The handover may be from a GEO cell to a LEO cell. The handover may be from a LEO cell to a GEO cell. The source cell and the target cell may be of the same satellite. The source cell and the target cell may be of different satellites. The source cell and the target cell may be of the same network type. The source cell and the target cell may be of different network types. The source cell and the target cell may be linked to the same gateway and/or gNB. The source cell and the target cell may be linked to different gateways and/or gNBs. The handover may be a serving link handover and/or a feeder link handover.

The handover procedure may be Random Access (RA)-based and/or RACH-less. The UE may or may not trigger an RA procedure in response to receiving an RRC reconfiguration message (e.g., RRCReconfigurtaion). The UE may or may not trigger an RA procedure for a handover procedure. For an RA-based handover procedure, the UE may trigger an RA procedure (e.g., a 2-step RA, 4-step RA, contention-based RA, and/or contention free RA procedure) and transmit an RRC message (e.g., RRCReconfigurationComplete) in MSGB, Msg4, and/or subsequent UL transmission after MSGB/Msg4. For a RACH-less handover procedure, the UE may not trigger an RA procedure and the UE may transmit an RRC message (e.g., RRCReconfigurationComplete) in a configured grant (e.g., received in RRCReconfigurtaion) and/or a dynamic grant (e.g., received on the Physical Downlink Control Channel (PDCCH) of the target cell).

In response to receiving the handover command/RRC reconfiguration message (e.g., RRCReconfiguration including ReconfigurationWithsync), the UE would start a timer T304 (handover failure detection timer). Upon successful completion of an RA procedure for the handover procedure (or completion of the handover procedure), the UE would stop the timer T304. If the timer T304 expires, the UE would consider the handover procedure fails. If the timer T304 expires, the UE would revert back to configurations used in the source cell and trigger an RRC re-establishment procedure. In the RRC re-establishment procedure, the UE would perform cell selection to select a new cell. The UE would transmit an RRC re-establishment request message (e.g., RRCReestablishmentRequest) to the selected cell. If the re-establishment is successful, in response to transmitting the RRC re-establishment request message (e.g., RRCReestablishmentRequest), the UE would receive an RRC re-establishment message (e.g., RRCReestablishment) and consider the selected cell as the serving cell. Throughout the disclosure, the timer T304 may be a handover failure detection timer.

Throughout the disclosure, the "handover" may correspond to, may be supplemented with, and/or may be replaced by "reconfiguration with sync". The handover procedure may correspond to, may be supplemented with, and/or may be replaced by RRC reconfiguration procedure and/or procedure of reconfiguration with sync. A handover procedure may be triggered upon the UE receiving an RRC reconfiguration message (e.g., RRCReconfigurtaion) and/or upon the UE triggering an RA procedure for handover. Based on the specification [7] 3GPP TS 38.331 V17.1.0, upon the UE receiving an RRC reconfiguration message (e.g., RRCReconfigurtaion) with reconfigurationWithSync, the UE may perform the cell group configuration and/or reconfiguration with sync. A handover procedure may be triggered upon the UE executing a reconfiguration with sync. A handover procedure may be completed upon the UE transmits an RRC reconfiguration complete message (e.g., RRCReconfigurationComplete) in response to an RRC reconfiguration message (e.g., RRCReconfigurtaion). A handover procedure may be completed upon the UE camping/linking to the target cell. A handover procedure may be completed upon a handover failure occurrence (e.g., reconfiguration with sync failure occurs, T304 expiration, T420 expiration). After a handover procedure is triggered and before the handover procedure is completed, the UE may consider the handover procedure is ongoing. The UE may consider a handover procedure is ongoing if the handover has not been completed after it is triggered.

According to specification TS 38.331 V17.0.0 ([5] 3GPP TS 38.331 V17.0.0, "NR, Radio Resource Control (RRC) protocol specification") and the running CR (e.g., [3] R2-2206502, "Correction for NR NTN WI" and/or according to specification [7] TS 38.331 V17.1.0), the UE would (re)start a validity timer (e.g., T430 in [7] 3GPP TS 38.331 V17.1.0, for serving cell) in response to acquiring SIB19. When the validity timer is running, the UE would consider the (satellite) assistance information (e.g., epochTime, ephemerisInfo, ta-Info) (e.g., received in SIB19, for serving cell) as valid. When the validity timer is running, the UE could use the (satellite) assistance information, e.g., received in SIB19, to perform (at least) TA pre-compensation, and/or UL transmission on the serving cell.

According to running RRC CR (e.g., [3] R2-2206502) and/or the specification [7] TS 38.331 V17.1.0, the UE does not handle the validity timer when the UE performs handover and/or switches to a target cell. The validity timer (e.g., for serving cell, T430 in [7] 3GPP TS 38.331 V17.1.0) would keep running during the handover procedure until the UE acquires SIB19 in the target cell after the handover procedure is completed. The UE may apply (satellite) assistance information comprising (at least) epoch time (e.g., epochTime), validity duration, satellite ephemeris information (e.g., ephemerisInfo), and/or parameters for (common) TA (e.g., ta-Info) for a target cell. The (satellite) assistance information may be received in the handover command/RRC Reconfiguration message and/or in a neighbor cell list of a system information of the source cell. The received (satellite) assistance information may be considered as valid during the received validity duration after the received epoch time (e.g., epochTime). However, the validity timer may expire during the handover procedure or before the UE acquires SIB19 after handover procedure is completed. The validity timer may not represent the valid time for the satellite information (e.g., epochTime, ephemerisInfo, ta-Info) of the target cell, e.g., during the handover procedure. The (satellite) assistance information (e.g., epochTime, ephemerisInfo, ta-Info) may be considered as invalid upon the validity timer expiration. In response to the validity timer expiration, the UE would suspend UL transmission, resulting in interruption during the period. In response to the validity timer expiration, the UE would suspend UL transmission and/or flush HARQ buffers, resulting in interruption during the period. Moreover, in response to the validity timer expiration (e.g., before handover completion), the UE would acquire SIB19 (of source cell) with (updated) satellite assistance information, which would be subsequently released after handover procedure completion.

When a UE performs handover to a target cell (e.g., from cell 1 to cell 2), T430 from the source cell (e.g., cell 1) would keep running. The UE would acquire SIB19 in the target cell (e.g., cell 2) after handover and restart T430 upon receiving SIB19 in the target cell. Before T430 is restarted in the target cell (e.g., cell 2), T430 is running based on epoch time and validity duration of the source cell (e.g., cell 1). However, the UL synchronization information (e.g., ephemeris, common TA info) of the source cell (e.g., cell 1) could not be applied for the target cell (e.g., cell 2) and cannot be used to access the target cell (e.g., cell 2). The epoch time may be epochTime. The validity duration may be ntn-UlSyncValidityDuration.

Figure 9:
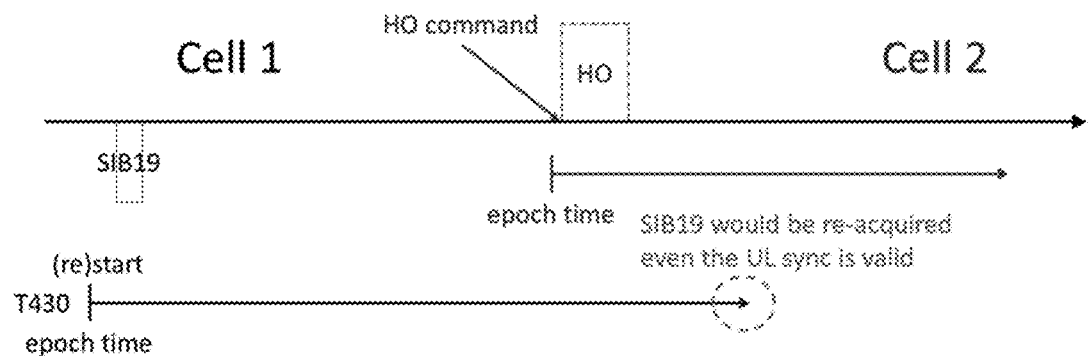
FIG. 9 is a first example diagram of issues during handover, in accordance with embodiments of the present invention.

For example, as shown in FIG. 9, The UE acquires SIB19 in a serving cell (e.g., cell 1). In response to acquiring SIB19 of the serving cell, the UE starts or restarts T430 based on the epoch time and validity duration of the serving cell (e.g., cell 1). The UE receives a handover command and triggers a handover procedure, e.g., when T430 is running. The UE uses the NTN configuration of a target cell (e.g., cell 2), e.g., from the handover command or SIB19 of the serving cell (e.g., cell 1), to access the target cell (e.g., cell 2). The NTN configuration of the target cell (e.g., cell 2) is considered as valid based on the epoch time and validity duration of the target cell. However, T430 may expire when the NTN configuration of the target cell (e.g., cell 2) is considered as valid. Upon T430 expiration, the UE acquires SIB19 even the UL synchronization is valid for the target cell (e.g., cell 2).

Figure 10:
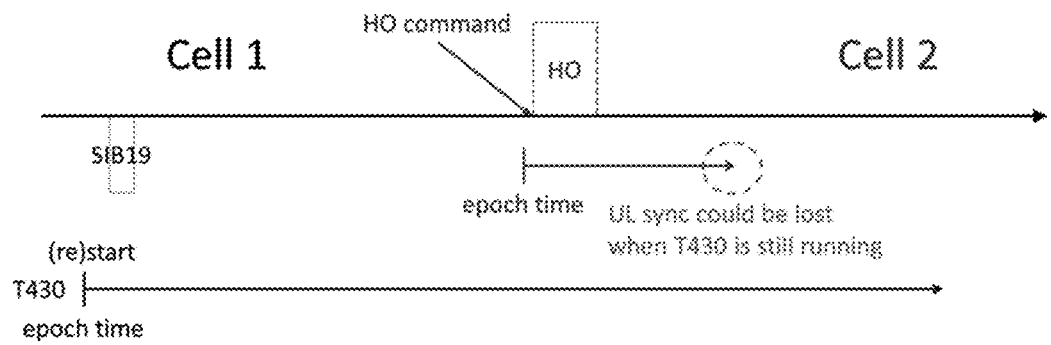
FIG. 10 is a second example diagram of issues during handover, in accordance with embodiments of the present invention.

For example, as shown in FIG. 10, The UE acquires SIB19 in a serving cell (e.g., cell 1). In response to acquiring SIB19 of the serving cell, the UE starts or restarts T430 based on the epoch time and validity duration of the serving cell (e.g., cell 1). The UE receives a handover command and triggers a handover procedure, e.g., when T430 is running. The UE uses the NTN configuration of a target cell (e.g., cell 2), e.g., from the handover command or SIB19 of the serving cell (e.g., cell 1), to access the target cell (e.g., cell 2). The NTN configuration of the target cell (e.g., cell 2) is considered as valid based on the epoch time and validity duration of the target cell. However, T430 may keep running when the NTN configuration of the target cell (e.g., cell 2) is considered as invalid. The UE does not acquire SIB19 even when the UL synchronization is invalid or lost for the target cell (e.g., cell 2).

Moreover, the handover procedure may fail and/or a handover failure may occur. The timer T304 may expire when the validity timer (e.g., T430) is running. The UE may trigger an RRC re-establishment procedure (and perform cell selection), e.g., when the validity timer (e.g., T430) is running. Upon the RRC re-establishment procedure initiating, the satellite information for the source cell (e.g., received in SIB19 of source cell) and/or satellite information for the target cell (e.g., received in HO command) could not be suitable for the UE to access a selected cell. The validity timer may not represent the valid time for applicable satellite information (e.g., epochTime, ephemerisInfo, ta-Info) during the RRC re-establishment procedure. In response to the validity timer expiration, the UE would suspend UL transmission, resulting in interruption during the RRC re-establishment procedure. If the RRC re-establishment procedure could not be successfully completed, the UE would go to RRC idle mode.

To solve the issue, the UE should prevent the validity timer from expiring during a handover procedure. The UE could keep a validity timer running during a handover procedure.

The UE may start and/or restart a validity timer (e.g., T430) during a handover procedure. For example, the UE may start and/or restart the validity timer (e.g., T430):

upon (or in response to) receiving a handover command (e.g., RRC reconfiguration with reconfigurationWithSync, the handover command including NTN configuration for target cell);

upon (or in response to) receiving/transmitting an RRC message (e.g., RRCReconfiguration, RRCReconfigurationComplete);

upon (or in response to) triggering a handover procedure;

upon (or in response to) completion of a handover procedure (e.g., handover is successfully completed);

upon (or in response to) expiration of the validity timer;

upon (or in response to) expiration of another validity timer (e.g., for the neighbor cell, for the serving cell, for the target cell, for the handover);

upon (or in response to) handover failure (e.g., T304 expiration); and/or upon (or in response to) initiation of an RRC re-establishment procedure (e.g., due to handover failure).

The UE may stop a validity timer (e.g., T430) during a handover procedure. For example, the UE may stop the validity timer:

upon (or in response to) receiving a handover command (e.g., RRC reconfiguration with reconfigurationWithSync, the handover command including NTN configuration for target cell);

upon (or in response to) receiving/transmitting an RRC message (e.g., RRCReconfiguration, RRCReconfigurationComplete);

upon (or in response to) triggering a handover procedure;

upon (or in response to) completion of a handover procedure (e.g., handover is successfully completed);

upon (or in response to) expiration of the validity timer;

upon (or in response to) expiration of another validity timer (e.g., for the neighbor cell, for the serving cell, for the target cell, for the handover);

upon (or in response to) handover failure (e.g., T304 expiration); and/or upon (or in response to) initiation of an RRC re-establishment procedure (e.g., due to handover failure).

The UE may receive a system information (e.g., SIB19) in a source cell. In response to receiving the system information (e.g., SIB19), the UE may start or restart a validity timer (e.g., T430) based on a first NTN configuration for the source cell. The first NTN configuration may be included in the system information (e.g., SIB19). The UE may receive a handover command (e.g., RRCReconfiguration with ReconfigurationWithSync) to trigger a handover procedure indicating a target cell. In response to receiving the handover command (e.g., RRCReconfiguration with ReconfigurationWithSync), the UE may stop the validity timer (e.g., T430), e.g., which is (re)started based on the first NTN configuration for the source cell. The UE may start the validity timer (e.g., T430) based on a second NTN configuration for the target cell. The second NTN configuration may comprise a validity duration and an epoch time (e.g., epochTime) for the target cell. The second NTN configuration may be included in the handover command (e.g., RRCReconfiguration with ReconfigurationWithSync) or the system information (e.g., SIB19).

The UE may start the validity timer upon (or in response to) receiving a handover command (e.g., RRCReconfiguration with reconfigurationWithSync). The UE may restart the validity timer upon (or in response to) receiving a handover command (e.g., RRCReconfiguration with reconfigurationWithSync). The UE may stop the validity timer upon (or in response to) receiving a handover command (e.g., RRCReconfiguration with reconfigurationWithSync). The UE may stop the validity timer upon (or in response to) handover failure (e.g., expiration of T304). The UE may stop the validity timer upon (or in response to) initiating an RRC re-establishment procedure.

In the above situations, the UE may stop a validity timer for the serving cell but not stop a validity timer for the neighbor cell. The UE may stop a validity timer for the serving cell and stop a validity timer for the neighbor cell. The UE may stop a validity timer for the neighbor cell but not stop a validity timer for the serving cell.

In the above situations, the UE may start or restart a validity timer for the serving cell but not start or restart a validity timer for the neighbor cell. The UE may start or restart a validity timer for the serving cell and start or restart a validity timer for the neighbor cell. The UE may start or restart a validity timer for the neighbor cell but not stop a validity timer for the serving cell.

The UE may stop the validity timer when the validity timer is running. The UE may start the validity timer when the validity timer is not running. The UE may restart the validity timer when the validity timer is running.

The UE may not consider the validity timer as expired during a handover procedure. In response to a validity timer expiration, if a handover procedure is ongoing, the UE may (re)start the validity timer. In response to a validity timer expiration, if a handover procedure is ongoing, the UE may not consider the validity timer as expired. The UE may not acquire SIB19 during a handover procedure. In response to a validity timer expiration (during a handover procedure), the UE may not acquire SIB19. In response to a validity timer expiration, if a handover procedure is ongoing, the UE may not acquire SIB19.

To solve the issue, the UE could not consider the (satellite) assistance information associated with target cell become invalid in response to a validity timer expiration. The (satellite) assistance information associated with target cell is the (satellite) assistance information received in a handover command/RRC Reconfiguration message. During a handover procedure, the UE may apply the validity timer to the source cell (and/or the neighbor cells of the source cell) and may not apply the validity timer to the target cell. The UE may (re)start the validity timer during a handover procedure. The UE may not (re)start the validity timer during a handover procedure. The UE may (re)start the validity timer in response to acquiring/receiving SIB19. In response to a validity timer expiration (during a handover procedure), the UE may not consider UL synchronization is lost for target cell. In response to a validity timer expiration (during a handover procedure), the UE may not suspend UL transmission on target cell.

To solve the issue, the UE could trigger/consider handover failure in response to a validity timer expiration during a handover procedure. The UE may not (re)start the validity timer in response to triggering of a handover procedure. The UE may (re)start the validity timer in response to triggering of a handover procedure. The UE may consider reconfiguration with sync failure as specified in section 5.3.5.8.3 of [3] R2-2206502, "Correction for NR NTN WI". Upon a validity timer expires during a handover procedure and/or handover failure occurs, the UE may perform at least one or more of the following actions:

go to RRC idle mode;

consider the RA procedure for handover is unsuccessfully completed;

trigger RRC (connection) re-establishment; and/or suspend UL transmission on the target cell.

The UE may not perform one or more of the above actions upon (or in response to) a validity timer expiration not during a handover procedure.

Any combination of the concepts or teachings above and herein can be jointly combined or formed to a new embodiment. The disclosed details and embodiments can be used to solve at least (but not limited to) the issues mentioned above and herein.

Throughout the disclosure, the validity timer may be a validity timer for the serving cell (or source cell). The validity timer may be a validity timer for the serving cell (or source cell) and neighbor cell(s). The validity timer may be a validity timer for neighbor cells. The validity timer may be a validity timer for a neighbor cell. The validity timer may be a validity timer for target cell. The UE may maintain multiple validity timers, e.g., one validity timer for the serving cell and one validity timer for neighbor cell, one validity timer for one serving or neighbor cell. Different validity timers may be handled differently. The validity timer (e.g., for the serving cell) may be an RRC timer (e.g., T430). The validity timer (e.g., for serving cell) may be the timer T430 in [7] 3GPP TS 38.331 V17.1.0. The validity timer may be used to maintain/evaluate UL synchronization. The validity timer may indicate/handle the time duration when the (associated) assistance information is valid. The validity timer may indicate/handle the time duration when the UE can apply the (associated) assistance information, e.g., without acquiring new assistance information.

The UE may (re)start a validity timer upon (or in response to) receiving an RRC Reconfiguration message. The UE may (re)start a validity timer upon (or in response to) transmitting an RRC response message (e.g., RRCReconfigurationComplete). The UE may (re)start a validity timer upon (or in response to) the validity timer expiration. The UE may (re)start a validity timer upon (or in response to) another validity timer expiration. The UE may (re)start a validity timer for neighbor cell(s) if one of the neighbor cells is a target cell. The UE may not (re)start a validity timer for neighbor cell(s) if none of the neighbor cells is a target cell. The UE may not (re)start a validity timer for serving cell if one of neighbor cells is a target cell. The UE may (re)start a validity timer for serving cell if none of neighbor cells is a target cell.

The UE may stop a validity timer upon (or in response to) receiving an RRC Reconfiguration message. The UE may stop a validity timer upon (or in response to) transmitting an RRC response message (e.g., RRCReconfigurationComplete). The UE may stop a validity timer for serving cell if one of neighbor cells is a target cell. The UE may not stop a validity timer for serving cell if none of neighbor cells is a target cell. The UE may not stop a validity timer for neighbor cell(s) if one of the neighbor cells is a target cell. The UE may stop a validity timer for serving cell if none of the neighbor cell(s) is a target cell.

The UE may not (re)start and/or stop a validity timer upon (or in response to) receiving an RRC Reconfiguration message. The UE may not (re)start and/or stop a validity timer upon (or in response to) transmitting an RRC response message (e.g., RRCReconfigurationComplete).

After/upon (or in response to) a handover procedure is completed, the UE may acquire SIB19, e.g., regardless of whether a validity timer is running. After/upon (or in response to) a handover procedure is completed, the UE may acquire SIB19 if a validity timer is not running. After/upon (or in response to) a handover procedure is completed, the UE may consider a validity timer expired. After a handover procedure is completed, the UE may acquire SIB19 upon (or in response to) a validity timer expiration.

The UE may receive/acquire SIB19 of a first cell (e.g., serving cell) with a first NTN configuration for the first cell (e.g., serving cell) and/or (at least) a second NTN configuration for a second cell (e.g., neighbor cell). Upon (or in response to) receiving/acquiring SIB19, the UE may (re)start a first validity timer and/or a second validity timer. The UE may receive a handover (HO) command/RRC Reconfiguration message indicating a third cell (e.g., target cell) with a third NTN configuration for the third cell (e.g., target cell).

In one example, in response to receiving the HO command/RRC Reconfiguration message, the UE may (re)start the first validity timer. In response to receiving the HO command/RRC Reconfiguration message, the UE may trigger a handover procedure. If the first validity timer expires during the handover procedure, the UE may consider handover failure. The UE may transmit an RRC response message (e.g., RRCReconfigurationComplete) and link to the third cell (e.g., target cell). If the first validity timer expires after the handover procedure completion, the UE may acquire SIB19 of the third cell (e.g., target cell).

In one example, in response to receiving the HO command/RRC Reconfiguration message, the UE may (re)start the first validity timer if the third cell (e.g., target cell) is different the second cell (e.g., neighbor cell). In response to receiving the HO command/RRC Reconfiguration message, the UE may or may not stop the second validity timer if the third cell (e.g., target cell) is different than the second cell (e.g., neighbor cell). In response to receiving the HO command/RRC Reconfiguration message, the UE may trigger a handover procedure. If the first validity timer expires during the handover procedure, the UE may consider handover failure. If the second validity timer expires during the handover procedure, the UE may not consider handover failure. The UE may transmit an RRC response message (e.g., RRCReconfigurationComplete) and link to the third cell (e.g., target cell). In response to completion of the handover procedure, the UE may stop the second validity timer. If the first validity timer expires after the handover procedure completion, the UE may acquire SIB19 of the third cell (e.g., target cell).

In one example, in response to receiving the HO command/RRC Reconfiguration message, the UE may (re)start the second validity timer if the third cell (e.g., target cell) is same as the second cell (e.g., neighbor cell). In response to receiving the HO command/RRC Reconfiguration message, the UE may or may not stop the first validity timer if the third cell (e.g., target cell) is same as the second cell (e.g., neighbor cell). In response to receiving the HO command/RRC Reconfiguration message, the UE may trigger a handover procedure. If the second validity timer expires during the handover procedure, the UE may consider handover failure. If the first validity timer expires during the handover procedure, the UE may not consider handover failure. If the first validity timer expires during the handover procedure, the UE may or may not acquire SIB19. The UE may transmit an RRC response message (e.g., RRCReconfigurationComplete) and link to the third cell (e.g., target cell). After, upon, or in response to the handover procedure completion, the UE may stop the second validity timer and/or consider the second validity timer expired. After, upon or in response to the handover procedure completion, the UE may (re)start the first validity timer. After, upon, or in response to the handover procedure completion, the UE may acquire SIB19 of the third cell (e.g., target cell). If the second validity timer expires after the handover procedure completion, the UE may acquire SIB19 of the third cell (e.g., target cell).

In one example, in response to receiving the HO command/RRC Reconfiguration message, the UE may stop the first validity timer and/or the second validity timer. In response to receiving the HO command/RRC Reconfiguration message, the UE may trigger a handover procedure. The UE may transmit an RRC response message (e.g., RRCReconfigurationComplete) and link to the third cell (e.g., target cell). After, upon, or in response to the handover procedure completion, the UE may acquire SIB19 of the third cell (e.g., target cell).

In one example, in response to receiving the HO command/RRC Reconfiguration message, the UE may trigger a handover procedure. If the first validity timer expires during the handover procedure, the UE may not consider handover failure. If the first validity timer expires during the handover procedure, the UE may continue the handover procedure. If the first validity timer expires during the handover procedure, the UE may or may not acquire SIB19 for the first cell. The UE may transmit an RRC response message (e.g., RRCReconfigurationComplete) and link to the third cell (e.g., target cell). If the first validity timer expires after the handover procedure completion, the UE may acquire SIB19 of the third cell (e.g., target cell). Upon or in response to the handover procedure completion, if the first validity timer is not running, the UE may acquire SIB19 of the third cell (e.g., target cell).

In one example, in response to receiving the HO command/RRC Reconfiguration message, the UE may trigger a handover procedure. If the first validity timer and/or second validity timer expires during the handover procedure, the UE may not consider handover failure. If the first validity timer and/or second validity timer expires during the handover procedure, the UE may continue the handover procedure. If the first validity timer and/or second validity timer expires during the handover procedure, the UE may or may not acquire SIB19 for the first cell. The UE may transmit an RRC response message (e.g., RRCReconfigurationComplete) and link to the third cell (e.g., target cell). After, upon, or in response to the handover procedure completion, the UE may stop the second validity timer. If the first validity timer and/or second validity timer expires after the handover procedure completion, the UE may acquire SIB19 of the third cell (e.g., target cell). Upon or in response to the handover procedure completion, if the first validity timer is not running, the UE may acquire SIB19 of the third cell (e.g., target cell).

In one example, in response to receiving the HO command/RRC Reconfiguration message, the UE may start a third validity timer. In response to receiving the HO command/RRC Reconfiguration message, the UE may trigger a handover procedure. If the third validity timer expires during the handover procedure, the UE may consider handover failure. If the first validity timer and/or the second validity timer expires during the handover procedure, the UE may not consider handover failure. If the first validity timer and/or the second validity timer expires during the handover procedure, the UE may or may not acquire SIB19 of the first cell (e.g., serving cell). The UE may transmit an RRC response message (e.g., RRCReconfigurationComplete) and link to the third cell (e.g., target cell). In response to completion of the handover procedure, the UE may stop the third validity timer. After, upon, or in response to the handover procedure completion, the UE may (re)start the first validity timer. After, upon, or in response to the handover procedure completion, the UE may acquire SIB19 of the third cell (e.g., target cell).

Figure 11:
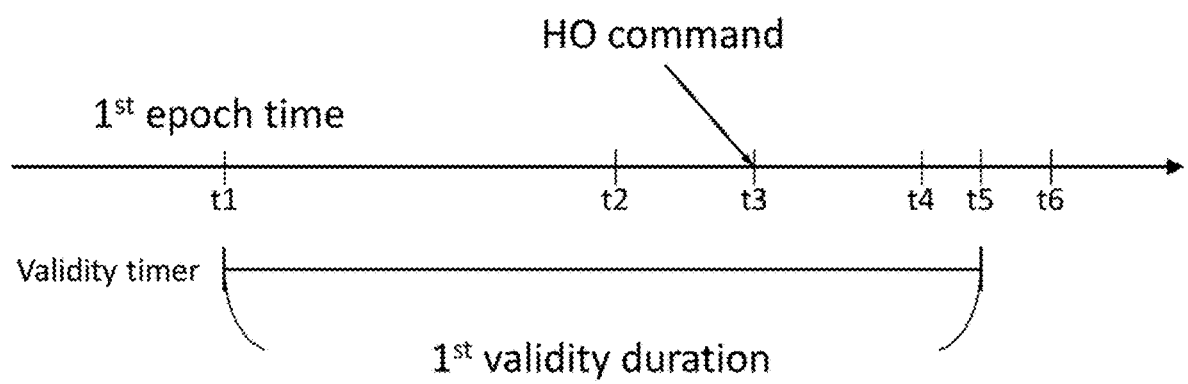
FIG. 11 is an example diagram of a second epoch time for a second cell (e.g., target cell), in accordance with embodiments of the present invention.

For example, the UE may receive SIB19 of a first cell (e.g., a serving cell), comprising a first NTN configuration of the first cell and/or a second NTN configuration of a second cell (e.g., a neighbor cell), in the first cell. The first NTN configuration may comprise (at least) a first epoch time (e.g., epochTime) and a first validity duration. As shown in FIG. 11, the first epoch time (e.g., epochTime) may be or may indicate time point t1. In response to receiving the SIB19 of the first cell, the UE may (re)start a validity timer (e.g., T430), e.g., at the subframe indicated by the first epoch time (e.g., epochTime) and with length of the first validity duration. The UE may apply the first NTN configuration in the first cell when the validity timer (e.g., T430) is running, e.g., to perform UL transmission, to compensate TA.

The UE may receive an RRC Reconfiguration message in the first cell, e.g., at time point t3. The RRC Reconfiguration message may comprise a configuration for reconfiguration with sync (e.g., ReconfigurationWithsync). The RRC Reconfiguration message may indicate the second cell (e.g., a target cell). The RRC Reconfiguration message may or may not comprise the second NTN configuration of the second cell. The second NTN configuration may comprise (at least) a second epoch time (e.g., epochTime) and a second validity duration. As shown in FIG. 11, the second epoch time (e.g., epochTime) may be or may indicate time point t2, t4, or t6.

The second epoch time (e.g., epochTime) may be past time. The second epoch time (e.g., epochTime) may be or may indicate a time point (e.g., t2 in FIG. 11) before the time point (e.g., t3 in FIG. 11) when the UE receives the RRC Reconfiguration message. The second epoch time (e.g., epochTime) may be future time. The second epoch time (e.g., epochTime) may be or may indicate a time point (e.g., t4, t6 in FIG. 11) after the time point (e.g., t3 in FIG. 11) when the UE receives the RRC Reconfiguration message. The second epoch time (e.g., epochTime) may be or may indicate a time point (e.g., t2, t4 in FIG. 11) before the time point (e.g., t5 in FIG. 11) indicated by the first epoch time (e.g., epochTime) plus the first validity duration. The second epoch time (e.g., epochTime) may be or may indicate a time point (e.g., t2, t4 in FIG. 11) when the validity timer (e.g., T430) is running, wherein the validity timer (e.g., T430) is (re)started in response to receiving the SIB19 of the first cell. The second epoch time (e.g., epochTime) may be or may indicate a time point (e.g., t6 in FIG. 11) after the time point (e.g., t5 in FIG. 11) indicated by the first epoch time (e.g., epochTime) plus the first validity duration. The second epoch time (e.g., epochTime) may be or may indicate a time point (e.g., t6 in FIG. 11) when the validity timer (e.g., T430) is not running or expires, wherein the validity timer (e.g., T430) is (re)started in response to receiving the SIB19 of the first cell.

In one example, the second epoch time (e.g., epochTime) may be or may indicate a subframe at time point t2 in FIG. 11. In response to receiving the RRC Reconfiguration message, the UE may (re)start the validity timer (e.g., T430) at the subframe indicated by the second epoch time (e.g., epochTime) and with length of the second validity duration. Since the time point t2 is before the time when the UE receives the RRC Reconfiguration message (e.g., time point t3), the UE may (re)start the validity timer (e.g., T430) upon receiving the RRC Reconfiguration message. Upon receiving the RRC Reconfiguration message (e.g., at time point t3), the UE may (re)start the validity timer (e.g., T430), e.g., if the second epoch time (e.g., epochTime) is (or indicates a subframe) prior to the time when the UE receives the RRC Reconfiguration message. The UE may apply the second NTN configuration to transmit an RRC reconfiguration complete message (e.g., RRCReconfigurationComplete) on the second cell, e.g., when the validity timer (e.g., T430) is running.

In one example, the second epoch time (e.g., epochTime) may be or may indicate a subframe at time point t4 in FIG. 11. In response to receiving the RRC Reconfiguration message, the UE may (re)start the validity timer (e.g., T430) at the subframe indicated by the second epoch time (e.g., epochTime) and with length of the second validity duration. Upon receiving the RRC Reconfiguration message (e.g., at time point t3), the UE may not (re)start the validity timer (e.g., T430), e.g., if the second epoch time (e.g., epochTime) is (or indicates a subframe) after the time when the UE receives the RRC Reconfiguration message. The UE may (re)start the validity timer (e.g., T430) at time point t4. The UE may apply the second NTN configuration to transmit an RRC reconfiguration complete message (e.g., RRCReconfigurationComplete) on the second cell, e.g., when the validity timer (e.g., T430) is running.

In one example, the second epoch time (e.g., epochTime) may be or may indicate a subframe at time point t6 in FIG. 11. In response to receiving the RRC Reconfiguration message, the UE may (re)start the validity timer (e.g., T430) at the subframe indicated by the second epoch time (e.g., epochTime) and with length of the second validity duration. Upon receiving the RRC Reconfiguration message (e.g., at time point t3), the UE may not (re)start the validity timer (e.g., T430), e.g., if the second epoch time (e.g., epochTime) is (or indicates a subframe) after the time when the UE receives the RRC Reconfiguration message. When the validity timer (e.g., T430) expires at time point t5, the UE may not consider expiration of the validity timer (e.g., T430) and/or the UE may not acquire SIB19. The UE may not (re-)acquire SIB19 before the validity timer (e.g., T430) expires (e.g., time point t5) during a handover procedure. The UE may not (re-)acquire SIB19 before the end of the validity duration (e.g., time point t5) during a handover procedure. In response to (or upon) the validity timer (e.g., T430) expires before the validity timer (e.g., T430) would be (re)started, the UE may not consider expiration of the validity timer (e.g., T430) and/or acquire SIB19, e.g., during a handover procedure. In response to (or upon) the validity timer (e.g., T430) expires during a handover procedure (e.g., at time point t5), the UE may not acquire SIB19. When the validity timer (e.g., T430) is not running, the UE may not apply the first or second NTN configuration. When the validity timer (e.g., T430) is not running, the UE may not perform UL transmission. The UE may start the validity timer (e.g., T430) at time point t6. The UE may apply the second NTN configuration to transmit an RRC reconfiguration complete message (e.g., RRCReconfigurationComplete) on the second cell, e.g., when the validity timer (e.g., T430) is running.

In one example, the second epoch time (e.g., epochTime) may be or may indicate a subframe at time point t2 in FIG. 11. In response to receiving the RRC Reconfiguration message, the UE may stop the validity timer (e.g., T430) upon receiving the RRC Reconfiguration message and start the validity timer (e.g., T430) at the subframe indicated by the second epoch time (e.g., epochTime) with length of the second validity duration. Since the time point t2 is before when the UE receives the RRC Reconfiguration message (e.g., time point t3), the UE may stop and start the validity timer (e.g., T430) (immediately) upon receiving the RRC Reconfiguration message. Upon receiving the RRC Reconfiguration message (e.g., at time point t3), the UE may stop and start the validity timer (e.g., T430) or the UE may restart the validity timer (e.g., T430), e.g., if the second epoch time (e.g., epochTime) is (or indicates a subframe) prior to the time when the UE receives the RRC Reconfiguration message. The UE may apply the second NTN configuration to transmit an RRC reconfiguration complete message (e.g., RRCReconfigurationComplete) on the second cell, e.g., when the validity timer (e.g., T430) is running.

In one example, the second epoch time (e.g., epochTime) may be or may indicate a subframe at time point t4 or t6 in FIG. 11. In response to receiving the RRC Reconfiguration message, the UE may stop the validity timer (e.g., T430) upon receiving the RRC Reconfiguration message and start the validity timer (e.g., T430) at the subframe indicated by the second epoch time (e.g., epochTime) and with length of the second validity duration. The UE may stop the validity timer (e.g., T430) upon receiving the RRC Reconfiguration message, e.g., at time point t3. When the validity timer (e.g., T430) is not running, the UE may not acquire SIB19. When the validity timer (e.g., T430) is not running, the UE may not apply the first or second NTN configuration. When the validity timer (e.g., T430) is not running, the UE may not perform UL transmission. The UE may start the validity timer (e.g., T430) at time point t4 or t6, e.g., as indicated by the second epoch time (e.g., epochTime). In response to receiving an RRC Reconfiguration message, the UE may stop the validity timer (e.g., T430) which is running based on a first NTN configuration of source cell at a first timing (e.g., time point t3). The UE may start the validity timer (e.g., T430) based on the second NTN configuration of the target cell at a second timing (e.g., time point t3). The UE may apply the second NTN configuration to transmit an RRC reconfiguration complete message (e.g., RRCReconfigurationComplete) on the second cell, e.g., when the validity timer (e.g., T430) is running.

Additionally and/or alternately, in one example, the UE may receive SIB19 of a first cell, comprising a first NTN configuration of the first cell and/or a second NTN configuration of a second cell, in the first cell. The first NTN configuration may comprise (at least) a first epoch time (e.g., epochTime) and a first validity duration. In response to receiving the SIB19 of the first cell, the UE may (re)start a validity timer (e.g., T430), e.g., at the subframe indicated by the first epoch time (e.g., epochTime) and with length of the first validity duration. The UE may apply the first NTN configuration in the first cell when the validity timer (e.g., T430) is running, e.g., to perform UL transmission, to compensate TA.

The UE may receive an RRC Reconfiguration message in the first cell. The RRC Reconfiguration message may comprise a configuration for reconfiguration with sync (e.g., ReconfigurationWithsync). The RRC Reconfiguration message may indicate a second cell. The RRC Reconfiguration message may or may not comprise the second NTN configuration of the second cell. The second NTN configuration may comprise (at least) a second epoch time (e.g., epochTime) and a second validity duration. In response to receiving the RRC Reconfiguration message, the UE may (re)start the validity timer (e.g., T430), e.g., at the subframe indicated by the second epoch time (e.g., epochTime) and with length of the second validity duration. In response to receiving the RRC Reconfiguration message, the UE may apply the configuration for reconfiguration with sync (e.g., ReconfigurationWithsync) and start a timer T304. The UE may apply the second NTN configuration to transmit an RRC reconfiguration complete message (e.g., RRCReconfigurationComplete) on the second cell, e.g., when the validity timer (e.g., T430) is running.

If the timer T304 expires, reconfiguration with sync failure may be considered by the UE. In response to expiration of the timer T304, the UE may revert back to configurations before receiving the configuration for reconfiguration with sync (e.g., ReconfigurationWithsync). In response to expiration of the timer T304, the UE may initiate an RRC connection re-establishment procedure. Upon initiating the RRC connection re-establishment procedure, the UE may perform cell selection and select a third cell. In response to (or upon) expiration of the timer T304, reconfiguration with sync failure, initiating the RRC connection re-establishment procedure, and/or performing cell selection, the UE may stop the validity timer (e.g., T430). When the validity timer (e.g., T430) is not running, the UE may consider uplink synchronization is lost and/or consider (part of) the first/second NTN configuration is invalid. When the validity timer (e.g., T430) is not running, the UE may not use (part of) the first/second NTN configuration and/or performing UL transmission. In response to (or upon) the validity timer (e.g., T430) is not running, the UE may not acquire SIB19 (e.g., of the first/second cell). In response to (or upon) the validity timer (e.g., T430) is not running, the UE may or may not flush HARQ buffers.

In response to selecting the third cell, the UE may receive SIB19 of the third cell, comprising a third NTN configuration of the third cell, from the third cell. The third NTN configuration may comprise (at least) a third epoch time (e.g., epochTime) and a third validity duration. In response to receiving the SIB19 of the third cell, the UE may start the validity timer (e.g., T430), e.g., at the subframe indicated by the third epoch time (e.g., epochTime) and with length of the third validity duration. In response to selecting the third cell, receiving SIB19 of the third cell, receiving the third NTN configuration, and/or the validity timer (e.g., T430) is running, the UE may transmit an RRC re-establishment request message (e.g., RRCReestablishmentRequest) on the third cell. The UE may apply the third NTN configuration to transmit the RRC re-establishment request message (e.g., RRCReestablishmentRequest), e.g., when the validity timer (e.g., T430) is running. In response to transmitting the RRC re-establishment request message (e.g., RRCReestablishmentRequest), the UE may receive an RRC re-establishment message (e.g., RRCReestablishment). The UE may apply the third NTN configuration in the third cell when the validity timer (e.g., T430) is running, e.g., to perform UL transmission, to compensate TA.

The first cell may be a serving cell, e.g., before performing the handover procedure. The first cell may be a source cell, e.g., during the handover procedure. The second cell may be a target cell, e.g., during the handover procedure. The third cell may be a target cell, e.g., during the RRC connection re-establishment procedure. The third cell may be a serving cell, e.g., after completing the RRC connection re-establishment procedure.

The UE may be in a cell of NTN. The UE may be connected to a cell of NTN. The UE may be connected to a LEO, GEO, MEO, HEO, and/or HAPS.

The UE may refer to the UE, an RRC entity of the UE, or a MAC entity of the UE.

The UE may be an NR device. The UE may be an NR-light device. The UE may be a reduced capability device. The UE may be a mobile phone. The UE may be a wearable device. The UE may be a sensor. The UE may be a stationary device.

The network may be a network node. The network may be a base station. The network may be an access point. The network may be an eNB. The network may be a gNB. The network may be a gateway.

Figure 12:
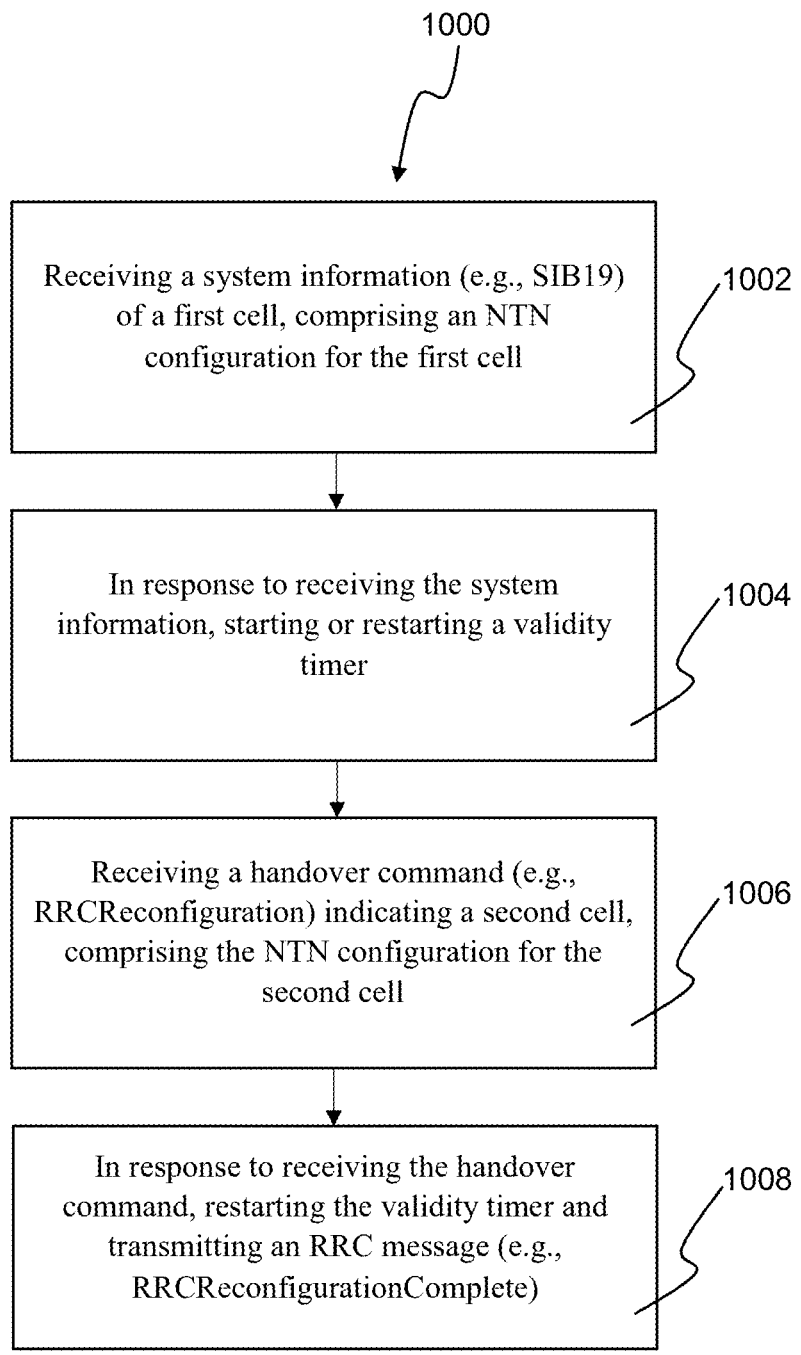
FIG. 12 is a flow diagram of a UE receiving a system information of a first cell, starting or restarting a validity timer in response to receiving the system information, receiving a handover command indicating a second cell, and restarting the validity timer and transmitting an RRC message, in accordance with embodiments of the present invention.

Referring to FIG. 12, with this and other concepts, systems, and methods of the present invention, a method 1000 for a UE in a wireless communication system comprises receiving a system information (e.g., SIB19) of a first cell, comprising an NTN configuration for the first cell (step 1002), in response to receiving the system information, starting or restarting a validity timer (step 1004), receiving a handover command (e.g., RRCReconfiguration) indicating a second cell, comprising the NTN configuration for the second cell (step 1006), and in response to receiving the handover command, restarting the validity timer and transmitting an RRC message (e.g., RRCReconfigurationComplete) (step 1008).

Referring back to FIGS. 3 and 4, in one or more embodiments from the perspective of a UE, the device 300 includes a program code 312 stored in memory 310 of the transmitter. The CPU 308 could execute program code 312 to: (i) receive a system information (e.g., SIB19) of a first cell, comprising an NTN configuration for the first cell; (ii) in response to receiving the system information, start or restart a validity timer; (iii) receive a handover command (e.g., RRCReconfiguration) indicating a second cell, comprising the NTN configuration for the second cell; and (iv) in response to receiving the handover command, restart the validity timer and transmit an RRC message (e.g., RRCReconfiguration-Complete). Moreover, the CPU 308 can execute the program code 312 to perform all of the described UE actions, steps, and methods described above, below, or otherwise herein.

Figure 13:
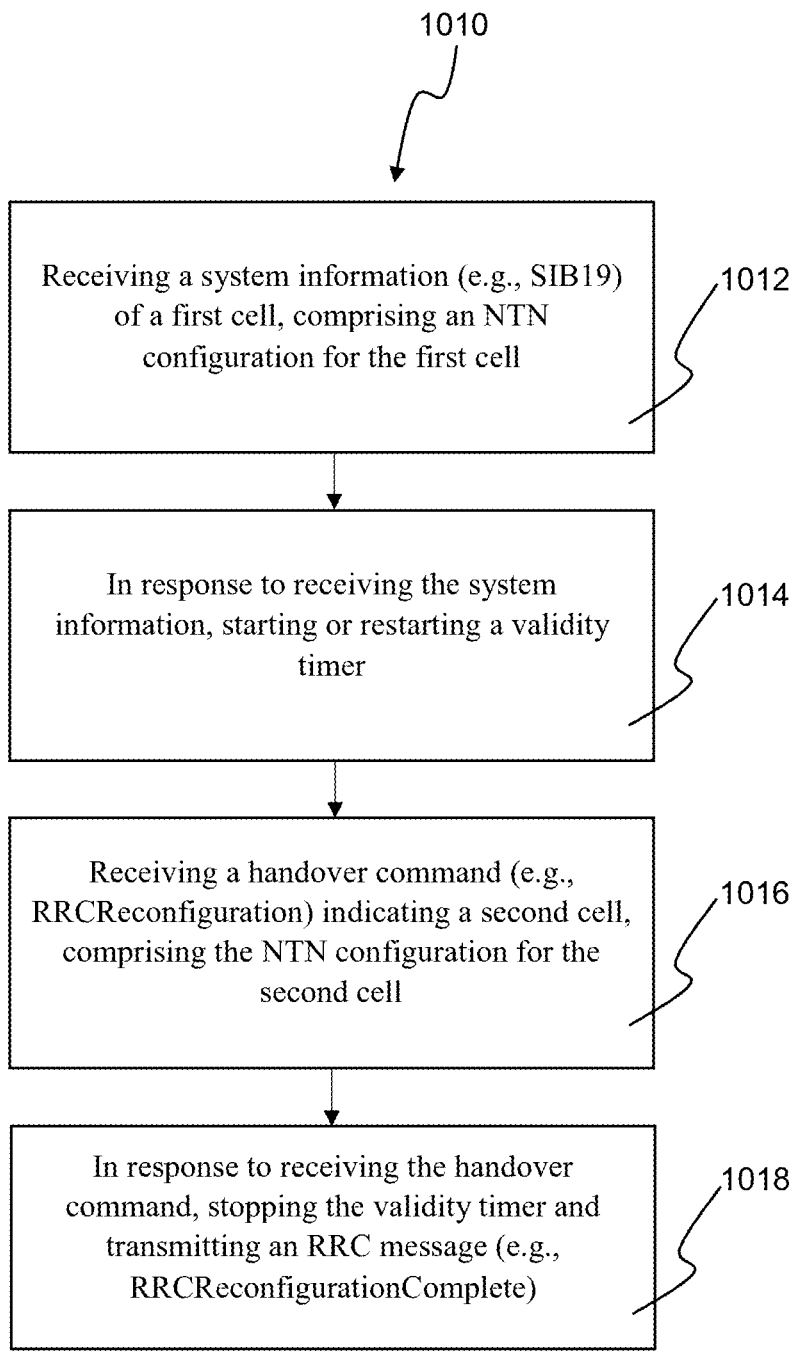
FIG. 13 is a flow diagram of a UE receiving a system information of a first cell, starting or restarting a validity timer in response to receiving the system information, receiving a handover command indicating a second cell, and stopping the validity timer and transmitting an RRC message, in accordance with embodiments of the present invention.

Referring to FIG. 13, with this and other concepts, systems, and methods of the present invention, a method 1010 for a UE in a wireless communication system comprises receiving a system information (e.g., SIB19) of a first cell, comprising an NTN configuration for the first cell (step 1012), in response to receiving the system information, starting or restarting a validity timer (step 1014), receiving a handover command (e.g., RRCReconfiguration) indicating a second cell, comprising the NTN configuration for the second cell (step 1016), and in response to receiving the handover command, stopping the validity timer and transmitting an RRC message (e.g., RRCReconfigurationComplete) (step 1018).

Referring back to FIGS. 3 and 4, in one or more embodiments from the perspective of a UE, the device 300 includes a program code 312 stored in memory 310 of the transmitter. The CPU 308 could execute program code 312 to: (i) receive a system information (e.g., SIB19) of a first cell, comprising an NTN configuration for the first cell; (ii) in response to receiving the system information, start or restart a validity timer; (iii) receive a handover command (e.g., RRCReconfiguration) indicating a second cell, comprising the NTN configuration for the second cell; and (iv) in response to receiving the handover command, stop the validity timer and transmitting an RRC message (e.g., RRCReconfiguration-Complete). Moreover, the CPU 308 can execute the program code 312 to perform all of the described UE actions, steps, and methods described above, below, or otherwise herein.

Figure 14:
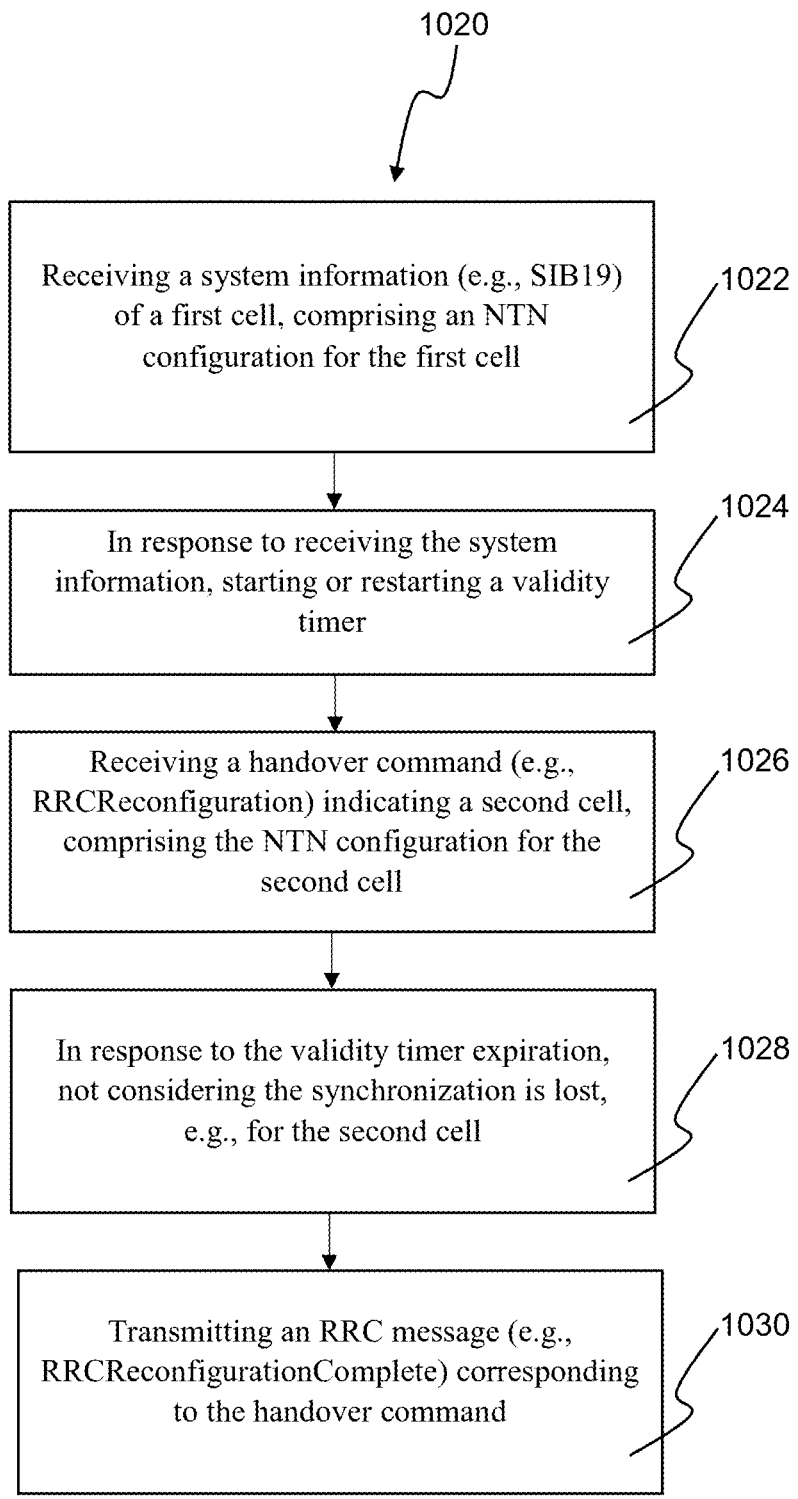
FIG. 14 is a flow diagram of a UE receiving a system information of a first cell, starting or restarting a validity timer in response to receiving the system information, receiving a handover command indicating a second cell, not considering the synchronization is lost in response to expiration of the validity timer, and transmitting an RRC message corresponding to the handover command, in accordance with embodiments of the present invention.

Referring to FIG. 14, with this and other concepts, systems, and methods of the present invention, a method 1020 for a UE in a wireless communication system comprises receiving a system information (e.g., SIB19) of a first cell, comprising an NTN configuration for the first cell (step 1022), in response to receiving the system information, starting or restarting a validity timer (step 1024), receiving a handover command (e.g., RRCReconfiguration) indicating a second cell, comprising the NTN configuration for the second cell (step 1026), in response to the validity timer expiration, not considering the synchronization is lost, e.g., for the second cell (step 1028), and transmitting an RRC message (e.g., RRCReconfigurationComplete) corresponding to the handover command (step 1030).

Referring back to FIGS. 3 and 4, in one or more embodiments from the perspective of a UE, the device 300 includes a program code 312 stored in memory 310 of the transmitter. The CPU 308 could execute program code 312 to: (i) receive a system information (e.g., SIB19) of a first cell, comprising an NTN configuration for the first cell; (ii) in response to receiving the system information, start or restart a validity timer; (iii) receive a handover command (e.g., RRCReconfiguration) indicating a second cell, comprising the NTN configuration for the second cell; (iv) in response to the validity timer expiration, not consider the synchronization is lost, e.g., for the second cell; and (v) transmit an RRC message (e.g., RRCReconfigurationComplete) corresponding to the handover command. Moreover, the CPU 308 can execute the program code 312 to perform all of the described UE actions, steps, and methods described above, below, or otherwise herein.

Figure 15:
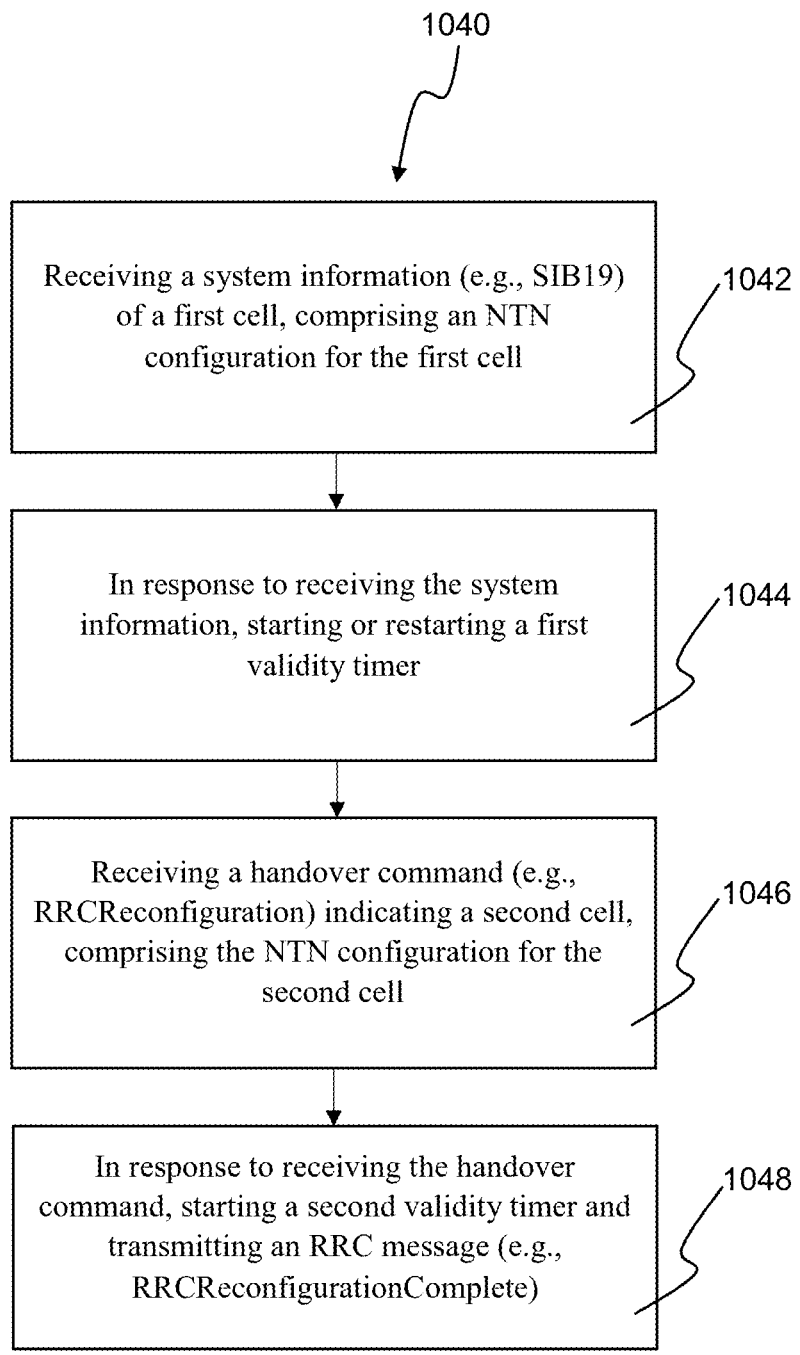
FIG. 15 is a flow diagram of a UE receiving a system information of a first cell, starting or restarting a first validity timer in response to receiving the system information, receiving a handover command indicating a second cell, and starting a second validity timer and transmitting an RRC message, in accordance with embodiments of the present invention.

Referring to FIG. 15, with this and other concepts, systems, and methods of the present invention, a method 1040 for a UE in a wireless communication system comprises receiving a system information (e.g., SIB19) of a first cell, comprising an NTN configuration for the first cell (step 1042), in response to receiving the system information, starting or restarting a first validity timer (step 1044), receiving a handover command (e.g., RRCReconfiguration)

indicating a second cell, comprising the NTN configuration for the second cell (step 1046), in response to receiving the handover command, starting a second validity timer and transmitting an RRC message (e.g., RRCReconfigurationComplete) (step 1048).

Referring back to FIGS. 3 and 4, in one or more embodiments from the perspective of a UE, the device 300 includes a program code 312 stored in memory 310 of the transmitter. The CPU 308 could execute program code 312 to: (i) receive a system information (e.g., SIB19) of a first cell, comprising an NTN configuration for the first cell; (ii) in response to receiving the system information, start or restart a first validity timer; (iii) receive a handover command (e.g., RRCReconfiguration) indicating a second cell, comprising the NTN configuration for the second cell; and (iv) in response to receiving the handover command, start a second validity timer and transmit an RRC message (e.g., RRCReconfigurationComplete). Moreover, the CPU 308 can execute the program code 312 to perform all of the described UE actions, steps, and methods described above, below, or otherwise herein.

Referring back to FIGS. 3 and 4, in one or more embodiments from the perspective of a NW, the device 300 includes a program code 312 stored in memory 310 of the transmitter. The CPU 308 could execute program code 312 to: (i) transmit to a UE a system information (e.g., SIB19) of a first cell, comprising an NTN configuration for the first cell; (ii) in response to receiving the system information, start or restart by the UE a first validity timer; (iii) transmit a handover command (e.g., RRCReconfiguration) to the UE indicating a second cell, comprising the NTN configuration for the second cell; and (iv) in response to receiving the handover command, start by the UE a second validity timer and transmit by the UE an RRC message (e.g., RRCReconfigurationComplete). Moreover, the CPU 308 can execute the program code 312 to perform all of the described NW actions, steps, and methods described above, below, or otherwise herein.

In the various embodiments above and herein, the NTN configuration is (or includes) at least one of validity duration, satellite ephemeris information (e.g., ephemerisInfo), and/or parameters for (common) TA (e.g., ta-Info).

In the various embodiments above and herein, the UE uses the NTN configuration in the handover command (e.g., RRCReconfiguration) to perform TA pre-compensation, UL synchronization, intra-frequency, cell reselection, and/or Synchronization Signal Block (SSB) based measurement timing configuration (SMTC) adjustments on the second cell.

In the various embodiments above and herein, the UE starts or restarts the (first) validity timer in response to receiving another system information (e.g., SIB19) of the second cell after transmitting the RRC message (e.g., RRCReconfigurationComplete).

Referring to FIG. 16, with this and other concepts, systems, and methods of the present invention, a method 1050 for a UE in a wireless communication system comprises receiving a first system information (e.g., SIB19) of a first cell, comprising an NTN configuration for the first cell (step 1052), in response to receiving the first system information (e.g., SIB19), starting or restarting a validity timer (e.g., T430) at the subframe indicated by a first epoch time (e.g., epochTime) of the first cell (step 1054), receiving a handover command (e.g., RRCReconfiguration) indicating a second cell, comprising the NTN configuration for the second cell (step 1056), and in response to receiving the handover command, restarting the validity timer (e.g., T430) at the subframe indicated by a second epoch time (e.g., epochTime) of the second cell (step 1058).

Referring back to FIGS. 3 and 4, in one or more embodiments from the perspective of a UE, the device 300 includes a program code 312 stored in memory 310 of the transmitter. The CPU 308 could execute program code 312 to: (i) receive a first system information (e.g., SIB19) of a first cell, comprising an NTN configuration for the first cell; (ii) in response to receiving the first system information (e.g., SIB19), start or restart a validity timer (e.g., T430) at the subframe indicated by a first epoch time (e.g., epochTime) of the first cell; (iii) receive a handover command (e.g., RRCReconfiguration) indicating a second cell, comprising the NTN configuration for the second cell; and (iv) in response to receiving the handover command, restart the validity timer (e.g., T430) at the subframe indicated by a second epoch time (e.g., epochTime) of the second cell. Moreover, the CPU 308 can execute the program code 312 to perform all of the described UE actions, steps, and methods described above, below, or otherwise herein.

Figure 17:
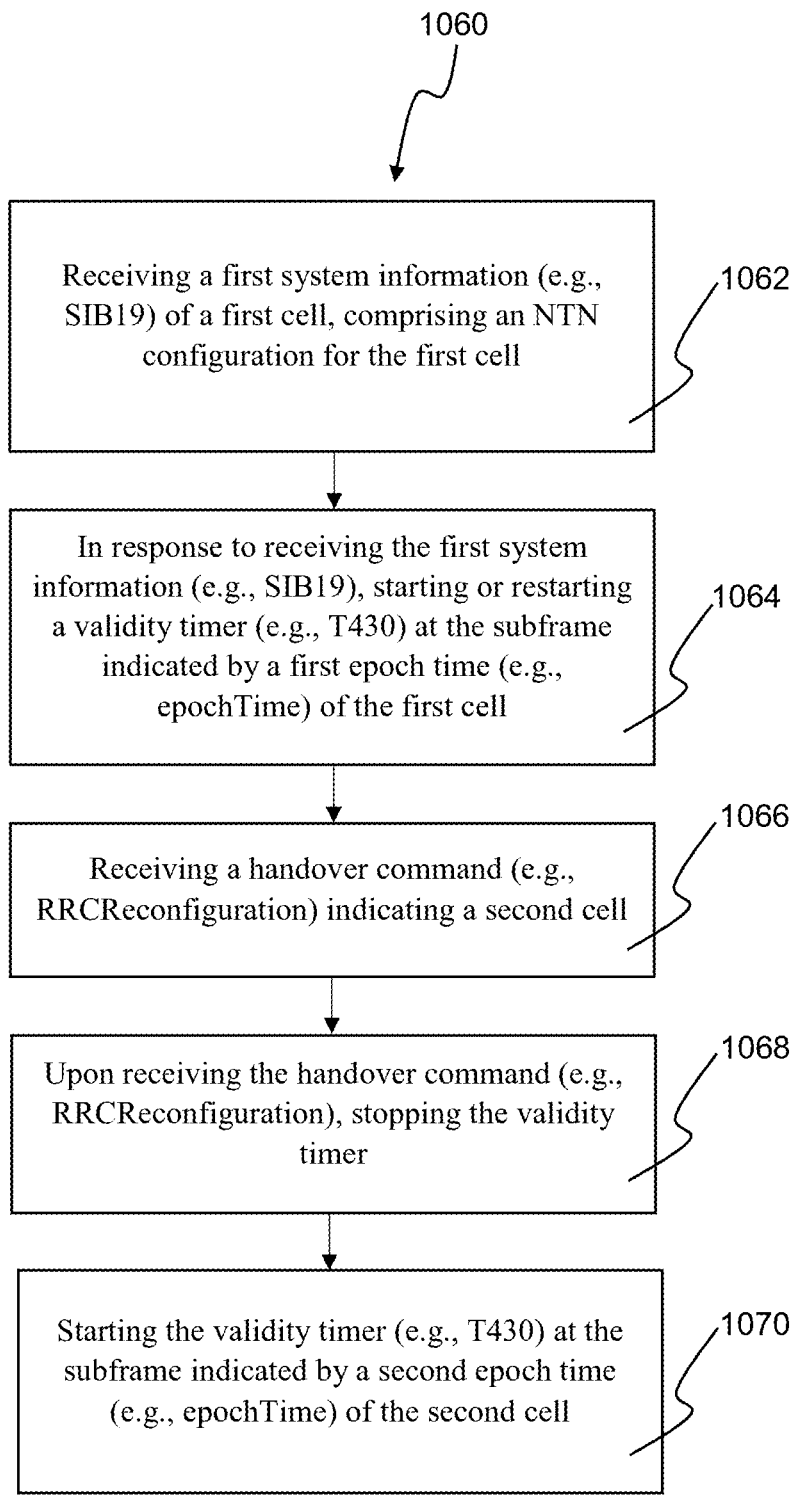
FIG. 17 is a flow diagram of a UE receiving a first system information of a first cell, starting or restarting a validity timer at the subframe indicated by a first epoch time of the first cell, receiving a handover command indicating a second cell, stopping the validity timer, and starting the validity timer at the subframe indicated by a second epoch time of the second cell, in accordance with embodiments of the present invention.

Referring to FIG. 17, with this and other concepts, systems, and methods of the present invention, a method 1060 for a UE in a wireless communication system comprises receiving a first system information (e.g., SIB19) of a first cell, comprising an NTN configuration for the first cell (step 1062), in response to receiving the first system information (e.g., SIB19), starting or restarting a validity timer (e.g., T430) at the subframe indicated by a first epoch time (e.g., epochTime) of the first cell (step 1064), receiving a handover command (e.g., RRCReconfiguration) indicating a second cell (step 1066), upon receiving the handover command (e.g., RRCReconfiguration), stopping the validity timer (e.g., T430) (step 1068), and starting the validity timer (e.g., T430) at the subframe indicated by a second epoch time (e.g., epochTime) of the second cell (step 1070).

In the various embodiments above and herein, the method further comprises transmitting an RRC message (e.g., RRCReconfigurationComplete), in response to receiving the handover command (e.g., RRCReconfiguration).

In the various embodiments above and herein, the NTN configuration is (or includes) at least epoch time (e.g., epochTime), validity duration, satellite ephemeris (e.g., ephemerisInfo), and/or common TA (e.g., ta-Info).

In the various embodiments above and herein, the first epoch time (e.g., epochTime) is comprised, configured, or indicated in the NTN configuration for the first cell.

In the various embodiments above and herein, the second epoch time (e.g., epochTime) is comprised, configured, or indicated in the NTN configuration for the second cell.

In the various embodiments above and herein, the NTN configuration for the second cell is received in the first system information (e.g., SIB19) of the first cell or in the handover command (e.g., RRCReconfiguration).

In the various embodiments above and herein, the NTN configuration in the handover command (e.g., RRCReconfiguration) is used by the UE to perform TA pre-compensation, UL synchronization, intra-frequency, cell reselection, and/or SMTC adjustments on the second cell.

In the various embodiments above and herein, the method further comprises starting or restarting the validity timer (e.g., T430), in response to receiving a second system information (e.g., SIB19) of the second cell after transmitting the RRC message (e.g., RRCReconfiguration Complete).

In the various embodiments above and herein, the handover command (e.g., RRCReconfiguration) comprises a configuration for reconfiguration with sync (e.g., ReconfigurationWithsync).

In the various embodiments above and herein, the method further comprises:
- in response to receiving the handover command (e.g., RRCReconfiguration), starting a handover failure detection timer (e.g., T304);
- in response to expiration of the handover failure detection timer (e.g., T304), initiating an RRC connection re-establishment procedure and stopping the validity timer (e.g., T430);
- selecting a third cell and receiving a third system information (e.g., SIB19) of the third cell;
- in response to receiving the third system information (e.g., SIB19), starting the validity timer (e.g., T430) at the subframe indicated by a third epoch time (e.g., epochTime) of the third cell; and/or
- transmitting an RRC message (e.g., RRCReestablishmentRequest) in response to initiating the RRC connection re-establishment procedure.

Referring back to FIGS. 3 and 4, in one or more embodiments from the perspective of a UE, the device 300 includes a program code 312 stored in memory 310 of the transmitter. The CPU 308 could execute program code 312 to: (i) receive a first system information (e.g., SIB19) of a first cell, comprising an NTN configuration for the first cell; (ii) in response to receiving the first system information (e.g., SIB19), start or restart a validity timer (e.g., T430) at the subframe indicated by a first epoch time (e.g., epochTime) of the first cell; (iii) receive a handover command (e.g., RRCReconfiguration) indicating a second cell; (iv) upon receiving the handover command (e.g., RRCReconfiguration), stop the validity timer (e.g., T430); and (v) start the validity timer (e.g., T430) at the subframe indicated by a second epoch time (e.g., epochTime) of the second cell. Moreover, the CPU 308 can execute the program code 312 to perform all of the described UE actions, steps, and methods described above, below, or otherwise herein.

The UE may receive separate validity duration and/or epoch time (e.g., epochTime) for the serving cell and the neighbor cell. A cell (e.g., a serving cell, a neighbor cell) may have its own configuration (or information) of validity duration and/or epoch time (e.g., epochTime) corresponding to the cell. The UE may receive more than one validity duration and/or epoch time (e.g., epochTime) in a system information (e.g., SIB19). According to specification [5] TS 38.331 V 17.0.0, the UE could receive an NTN configuration for the serving cell and receive up to four NTN configurations (e.g., NTN-Config) for neighbor cells. The validity durations (e.g., ntn-UlSyncValidityDuration) for the serving cell and the neighbor cell(s) may be different. The epoch times (e.g., epochTime) for the serving cell and the neighbor cell(s) may be different. According to the NTN RRC CR (e.g., [3] R2-2206502), the UE acquires SIB19 when the validity timer (e.g., T430) corresponding to the serving cell is expired, and the UE does not update the information in SIB19 for the neighbor cell(s). It is not clear how the UE handles the validity duration and/or validity timer for the serving cell and the neighbor cell(s), e.g., with multiple NTN configurations (e.g., NTN-Config).

To solve the issue, the UE could acquire SIB19 when (or if, or in response to) information in SIB19 becomes out-of-date (or invalid). The information may correspond to a serving cell and/or a neighbor cell. The information may be or comprise NTN configuration, epoch time (e.g., epochTime), (UL synchronization) validity duration, cell specific K offset (e.g., cellSpecificKoffset), K mac (e.g., kmac), TA information (e.g., ta-Info), DL NTN polarization (e.g., ntn-PolarizationDL), UL NTN polarization (e.g., ntn-PolarizationUL), ephemeris information (e.g., ephemerisInfo), and/or TA report indication (e.g., ta-Report). The information may become out-of-date (or invalid) if the corresponding validity time has passed. The validity time may be a (corresponding) validity duration after (corresponding) epoch time (e.g., epochTime).

To solve the issue, the UE could handle a single validity timer for the serving cell and/or the neighbor cell(s). The UE may acquire/receive SIB19 with multiple NTN configurations (e.g., NTN-Config) (for serving cell and/or for neighbor cell) comprising multiple validity durations (e.g., ntn-UlSyncValidityDuration) and/or epoch times (e.g., epochTime). Upon (or in response to) acquiring/receiving SIB19, the UE may start the validity timer at a start timing. The UE may apply a specific validity duration as the length of the validity timer. The UE may apply (the subframe indicated by) a specific epoch time (e.g., epochTime) as the start timing of the validity timer, e.g., after/upon acquiring/receiving SIB19. The UE may start the validity timer from the subframe indicated by the specific epoch time (e.g., epochTime).

The specific validity duration may be (at least) one of the following:
- the validity duration associated with the serving cell;
- the longest validity duration among received validity durations (e.g., in SIB19);
- the shortest validity duration among received validity durations (e.g., in SIB19);
- the validity duration associated with earliest epoch time among received epoch times (e.g., in SIB19); and/or
- the validity duration associated with latest epoch time among received epoch times (e.g., in SIB19).

The specific epoch time (e.g., epochTime) may be (at least) one of the following:
- the epoch time associated with the serving cell;
- the earliest epoch time among received epoch times (e.g., in SIB19);
- the latest epoch time among received epoch times (e.g., in SIB19);
- the epoch time associated with longest validity duration among received validity durations (e.g., in SIB19); and/or
- the epoch time associated with shortest validity duration among received validity durations (e.g., in SIB19).

The specific validity duration may be associated with the specific epoch time (e.g., epochTime). The specific validity duration and the specific epoch time (e.g., epochTime) may be associated with the same cell and/or the NTN configuration. The specific validity duration and the specific epoch time (e.g., epochTime) may be associated with different cells and/or NTN configurations (e.g., NTN-Config).

Upon acquiring/receiving SIB19, the UE may (re)start the validity timer with the length of the specific validity duration from the subframe indicated by the specific epoch time (e.g., epochTime). Upon (or before) the validity timer expiration, the UE may acquire SIB19. When the validity timer is running, the UE may consider UL synchronization for the serving cell. When the validity timer is running, the UE may perform UL transmission on the serving cell. When the validity timer is running, the UE may perform measurement (e.g., for SMTC/measurement gap adjustments) on the neighbor cell(s). When the validity timer is not running (e.g., upon/after the validity timer expiration), the UE may not consider UL synchronization for the serving cell. When the validity timer is not running (e.g., upon/after the validity timer expiration), the UE may not perform UL transmission on the serving cell. When the validity timer is not running (e.g., upon/after the validity timer expiration), the UE may suspend UL transmission on the serving cell and/or flush HARQ buffers for the serving cell. When the validity timer is not running, the UE may not perform measurement (e.g., for SMTC/measurement gap adjustments) on the neighbor cell(s).

To solve the issue, the UE could handle a first validity timer for the serving cell and/or handle a second validity timer for the neighbor cell(s). The UE may acquire/receive SIB19 with an NTN configuration for the serving cell comprising a first validity duration and a first epoch time (e.g., epochTime). The UE may acquire/receive SIB19 with multiple NTN configurations (e.g., NTN-Config) for neighbor cell(s) comprising multiple second validity durations (e.g., ntn-UlSyncValidityDuration) and/or second epoch times (e.g., epochTime). Upon (or in response to) acquiring/receiving SIB19, the UE may start the first validity timer at a first start timing. Upon (or in response to) acquiring/receiving SIB19, the UE may start the second validity timer at a second start timing.

The UE may apply the first validity duration as the length of the first validity timer. The UE may apply (the subframe indicated by) the first epoch time (e.g., epochTime) as the first start timing of the first validity timer, e.g., after/upon acquiring/receiving SIB19. The UE may start the first validity timer from the subframe indicated by the first specific epoch time (e.g., epochTime). The UE may apply a specific second validity duration as the length of the second validity timer. The UE may apply (the subframe indicated by) a specific second epoch time (e.g., epochTime) as the second start timing of the second validity timer, e.g., after/upon acquiring/receiving SIB19. The UE may start the second validity timer from the subframe indicated by the second specific epoch time (e.g., epochTime).

The first validity duration and/or first epoch time (e.g., epochTime) is associated with the serving cell. The second validity duration and/or second epoch time (e.g., epochTime) is associated with the neighbor cell(s) (e.g., configured in the neighbor cell list (e.g., ntn-NeighCellConfig-List)).

The specific second validity duration may be (at least) one of the following:
an indicated second validity duration;
the longest second validity duration among received second validity durations (e.g., in SIB19);
the shortest second validity duration among received second validity durations (e.g., in SIB19);
the second validity duration associated with earliest second epoch time among received second epoch times (e.g., in SIB19); and/or
the second validity duration associated with latest second epoch time among received second epoch times (e.g., in SIB19).

The specific second epoch time (e.g., epochTime) may be (at least) one of the following:
an indicated second epoch time;
the earliest second epoch time among received second epoch times (e.g., in SIB19);
the latest second epoch time among received second epoch times (e.g., in SIB19);
the second epoch time associated with longest second validity duration among received second validity durations (e.g., in SIB19);
the second epoch time associated with shortest second validity duration among received second validity durations (e.g., in SIB19); and/or
each received second epoch time (e.g., in SIB19).

The indicated second validity duration and/or indicated second epoch time may be indicated in SIB19. The indicated second validity duration and/or indicated second epoch time may be associated with the neighbor cell with the smallest index in the neighbor cell list (e.g., ntn-NeighCellConfig-List). The indicated second validity duration and/or indicated second epoch time may be associated with the neighbor cell with an indicated PCI.

The specific second validity duration may be associated with the specific second epoch time (e.g., epochTime). The specific second validity duration and the specific second epoch time (e.g., epochTime) may be associated with the same cell and/or NTN configuration. The specific second validity duration and the specific second epoch time (e.g., epochTime) may be associated with different cells and/or NTN configurations (e.g., NTN-Config).

Alternatively and/or additionally, the UE may acquire/receive SIB19 with multiple NTN configurations (e.g., NTN-Config) for neighbor cell(s) comprising multiple second validity durations (e.g., ntn-UlSyncValidityDuration) and/or second epoch times (e.g., epochTime). The second validity durations (e.g., ntn-UlSyncValidityDuration) are configured with the same value. The second epoch times (e.g., epochTime) are configured with the same value. The UE may apply (any of) the second validity duration as the length of the second validity timer. The UE may apply (any of) the second epoch time (e.g., epochTime) as the second start timing of the second validity timer, e.g., after/upon acquiring/receiving SIB19.

Alternatively and/or additionally, the UE may acquire/receive SIB19 with one or multiple NTN configuration for neighbor cell(s) comprising a second validity duration and/or a second epoch time (e.g., epochTime). The second validity duration and/or second epoch time (e.g., epochTime) may be configured in an NTN configuration for neighbor cell and may not be configured in another NTN configuration for the neighbor cell. The second validity duration and/or second epoch time (e.g., epochTime) may be configured in merely one NTN configuration for the neighbor cell. The UE may apply the second validity duration as the length of the second validity timer. The UE may apply the second epoch time (e.g., epochTime) as the second start timing of the second validity timer after/upon acquiring/receiving SIB19.

Upon (or in response to) acquiring/receiving SIB19, the UE may (re)start the first validity timer with the length of the first validity duration from the subframe indicated by the first epoch time (e.g., epochTime). Upon (or before, or in response to) the first validity timer expiration, the UE may acquire SIB19. When the first validity timer is running, the UE may consider UL synchronization for the serving cell. When the first validity timer is running, the UE may perform UL transmission on the serving cell. When the first validity timer is running, the UE may perform measurement (e.g., for SMTC/measurement gap adjustments) on the neighbor cell(s). When the first validity timer is running, the UE may not perform measurement (e.g., for SMTC/measurement gap adjustments) on the neighbor cell(s). When the first validity timer is not running (e.g., upon/after the validity timer expiration), the UE may not consider UL synchronization for the serving cell. When the first validity timer is not running (e.g., upon/after the validity timer expiration), the UE may not perform UL transmission on the serving cell.

When the first validity timer is not running (e.g., upon/after the validity timer expiration), the UE may suspend UL transmission on the serving cell and/or flush HARQ buffers for the serving cell. When the first validity timer is not running, the UE may not perform measurement (e.g., for SMTC/measurement gap adjustments) on the neighbor cell(s). When the first validity timer is not running, the UE may perform measurement (e.g., for SMTC/measurement gap adjustments) on the neighbor cell(s). The UE may perform measurement (e.g., for SMTC/measurement gap adjustments) on the neighbor cell(s) regardless of whether the first validity timer is running. The UE may consider the second validity timer expired if the first validity timer expires.

Upon (or in response to) acquiring/receiving SIB19, the UE may (re)start the second validity timer with the length of the specific second validity duration from the subframe indicated by the specific second epoch time (e.g., epochTime). Upon (or before) the second validity timer expiration, the UE may acquire SIB19. Upon (or before) the second validity timer expiration, the UE may not acquire SIB19. When the second validity timer is running, the UE may perform measurement (e.g., for SMTC/measurement gap adjustments) on the neighbor cell(s). When the second validity timer is not running (e.g., upon/after the validity timer expiration), the UE may not perform measurement (e.g., for SMTC/measurement gap adjustments) on the neighbor cell(s). When the second validity timer is not running (e.g., upon/after the validity timer expiration), the UE may release the NTN configuration of the (corresponding) neighbor cell(s). When the second validity timer is not running (e.g., upon/after the validity timer expiration), the UE may remove the (corresponding) neighbor cell(s) from the received neighbor cell list (e.g., ntn-NeighCellConfigList). The UE may perform UL transmission on the serving cell regardless of whether the second validity timer is running.

For example, upon (or in response to) the second validity timer expiration, the UE may stop performing measurement (e.g., for SMTC/measurement gap adjustments) and/or suspend the measurement (e.g., for SMTC/measurement gap adjustments) on the neighbor cell(s). The UE may acquire SIB19 after/upon the second validity timer expiration. The UE may not acquire SIB19 after/upon the second validity timer expiration. The UE may acquire SIB19 after/upon the first validity timer expiration. In response to acquiring/receiving SIB19, the UE may start the second validity timer based on NTN configuration in SIB19.

To solve the issue, the UE could handle a first validity timer for the serving cell and/or multiple second validity timers for (corresponding) neighbor cells indicated in SIB19. The UE may acquire/receive SIB19 with an NTN configuration for the serving cell comprising a first validity duration and a first epoch time (e.g., epochTime). The UE may acquire/receive SIB19 with multiple NTN configurations (e.g., NTN-Config) for neighbor cells comprising multiple second validity durations (e.g., ntn-UlSyncValidityDuration) and/or second epoch times (e.g., epochTime). Upon (or in response to) acquiring/receiving SIB19, the UE may start the first validity timer at a first start timing. Upon (or in response to) acquiring/receiving SIB19, the UE may start each second validity timer at each second start timing.

The UE may apply the first validity duration as the length of the first validity timer. The UE may apply (the subframe indicated by) the first epoch time (e.g., epochTime) as the first start timing of the first validity timer, e.g., after/upon acquiring/receiving SIB19. The UE may start the first validity timer from the subframe indicated by the first epoch time (e.g., epochTime). The UE may apply each second validity duration as the length of each second validity timer. The UE may apply (the subframe indicated by) each second epoch time (e.g., epochTime) as the second start timing of each second validity timer, e.g., after/upon acquiring/receiving SIB19. The UE may start the second validity timers from the subframe indicated by the associated second epoch times (e.g., epochTime).

The first validity duration and/or first epoch time (e.g., epochTime) is associated with the serving cell. The second validity durations (e.g., ntn-UlSyncValidityDuration) and/or second epoch times (e.g., epochTime) are associated with neighbor cells (e.g., configured in neighbor cell list (e.g., ntn-NeighCellConfigList)). Each neighbor cell configured in the neighbor cell list (e.g., ntn-NeighCellConfigList) in SIB19 may be associated with a second validity duration e.g., ntn-UlSyncValidityDuration) and/or a second epoch time (e.g., epochTime).

Upon (or in response to) acquiring/receiving SIB19, the UE may (re)start the first validity timer with the length of the first validity duration from the subframe indicated by the first epoch time (e.g., epochTime). Upon (or before) the first validity timer expiration, the UE may acquire SIB19. When the first validity timer is running, the UE may consider UL synchronization for the serving cell. When the first validity timer is running, the UE may perform UL transmission on the serving cell. When the first validity timer is running, the UE may perform measurement (e.g., for SMTC/measurement gap adjustments) on the neighbor cell(s). When the first validity timer is running, the UE may not perform measurement (e.g., for SMTC/measurement gap adjustments) on the neighbor cell(s). When the first validity timer is not running (e.g., upon/after the validity timer expiration), the UE may not consider UL synchronization for the serving cell. When the first validity timer is not running (e.g., upon/after the validity timer expiration), the UE may not perform UL transmission on the serving cell. When the first validity timer is not running (e.g., upon/after the validity timer expiration), the UE may suspend UL transmission on the serving cell and/or flush HARQ buffers for the serving cell. When the first validity timer is not running, the UE may not perform measurement (e.g., for SMTC/measurement gap adjustments) on the neighbor cell(s). When the first validity timer is not running, the UE may perform measurement (e.g., for SMTC/measurement gap adjustments) on the neighbor cell(s). The UE may perform measurement (e.g., for SMTC/measurement gap adjustments) on the neighbor cell(s) regardless of whether the first validity timer is running. The UE may consider the second validity timer expired if the first validity timer expires.

Upon (or in response to) acquiring/receiving SIB19, the UE may (re)start a second validity timer with the length of a second validity duration from the subframe indicated by a second epoch time (e.g., epochTime). The UE may (re)start a second validity timer for each neighbor cell (e.g., indicated in SIB19). The UE may (re)start multiple second validity timers for multiple neighbor cells (e.g., indicated in SIB19). Upon (or before) the second validity timer(s) expiration, the UE may acquire SIB19. Upon (or before) the second validity timer(s) expiration, the UE may not acquire SIB19. When a second validity timer is running, the UE may perform measurement (e.g., for SMTC/measurement gap adjustments) on the corresponding neighbor cell. When a second validity timer is not running (e.g., upon/after the validity timer expiration), the UE may not perform measurement (e.g., for SMTC/measurement gap adjustments) on the corresponding neighbor cell(s). When a second validity timer is not running (e.g., upon/after the validity timer expiration), the UE may release the NTN configuration of the corresponding neighbor cell. When a second validity timer is not running (e.g., upon/after the validity timer expiration), the UE may remove the corresponding neighbor cell from the received neighbor cell list (e.g., ntn-NeighCellConfigList). The UE may perform UL transmission on the serving cell regardless of whether the second validity timer(s) are running. The UE may perform measurement (e.g., for SMTC/measurement gap adjustments) on a first neighbor cell if the corresponding second validity timer is running, regardless of whether the other second validity timers are running.

The UE may acquire/receive SIB19 with a first NTN configuration e.g., NTN-Config) for the serving cell. The first NTN configuration may comprise a first validity duration and/or a first epoch time (e.g., epochTime). The UE may acquire/receive SIB19 with (at least) a second NTN configuration and a third NTN configuration for neighbor cell(s). The second NTN configuration may comprise a second validity duration and/or a second epoch time (e.g., epochTime). The third NTN configuration may comprise a third validity duration and/or a third epoch time (e.g., epochTime).

The UE may handle a single validity timer for the serving cell and the neighbor cells if (at least) one of the following conditions is fulfilled:
  the first, second, and/or third validity durations (e.g., ntn-UlSyncValidityDuration) are configured with the same value;
  the first, second, and/or third epoch times (e.g., epochTime) are configured with the same value;
  the second and/or third validity duration is not received/present in SIB19; and/or
  the second and/or third epoch time (e.g., epochTime) is not received/present in SIB19.

The UE may handle a validity timer for the serving cell and handle another validity timer for the neighbor cell(s) if (at least) one of the following conditions is fulfilled:
  the second and/or third validity durations (e.g., ntn-UlSyncValidityDuration) are configured with a different value from the first validity duration;
  the second and/or third epoch times (e.g., epochTime) are configured with a different value from the second epoch time (e.g., epochTime);
  the second and/or third validity duration is received/present in SIB19;
  the second and/or third epoch time (e.g., epochTime) is received/present in SIB19;
  the third validity duration is configured with same value as the second validity duration;
  the third epoch time (e.g., epochTime) is configured with same value as the second epoch time (e.g., epochTime);
  the third validity duration is not received/present in SIB19; and/or
  the third epoch time (e.g., epochTime) is not received/present in SIB19.

The UE may handle a validity timer for the serving cell and handle multiple validity timers for the neighbor cells if (at least) one of the following conditions is fulfilled:
  the third validity duration is configured with a different value from the second validity duration;
  the third epoch time (e.g., epochTime) is configured with a different value from the first epoch time (e.g., epochTime);
  the third validity duration is received/present in SIB19; and/or
  the third epoch time (e.g., epochTime) is received/present in SIB19.

Figure 18:
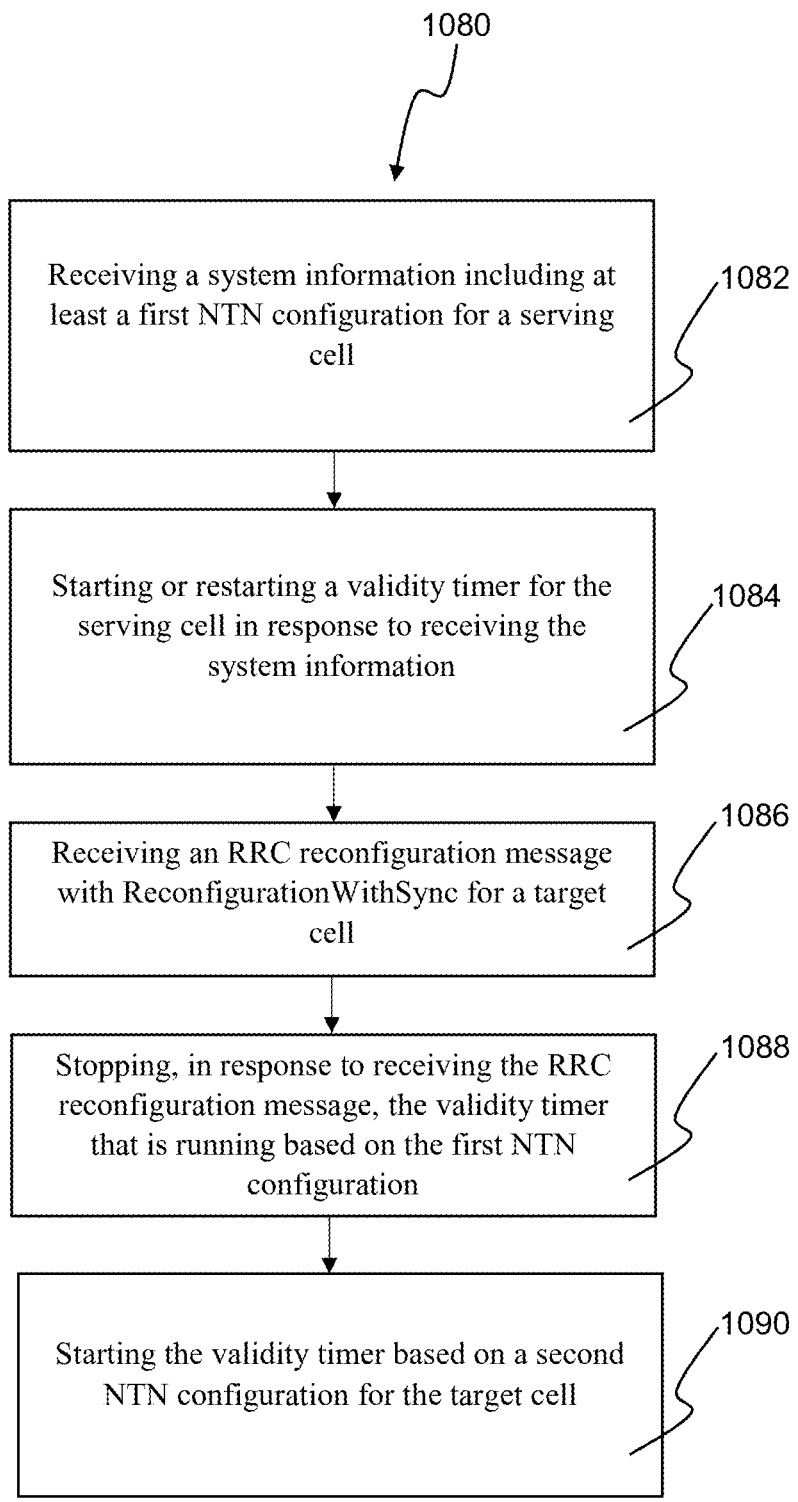
FIG. 18 is a flow diagram of a UE receiving a system information, starting or restarting a validity timer for the serving cell, receiving an RRC reconfiguration message, stopping the validity timer that is running on the first NTN configuration, and starting the validity timer based on a second NTN configuration for the target cell, in accordance with embodiments of the present invention.

Referring to FIG. 18, with this and other concepts, systems, and methods of the present invention, a method 1080 for a UE in a wireless communication system comprises receiving a system information including at least a first NTN configuration for a serving cell (step 1082), starting or restarting a validity timer for the serving cell in response to receiving the system information (step 1084), receiving an RRC reconfiguration message with ReconfigurationWithSync for a target cell (step 1086), stopping, in response to receiving the RRC reconfiguration message, the validity timer that is running based on the first NTN configuration (step 1088), and starting the validity timer based on a second NTN configuration for the target cell (step 1090).

In the various embodiments above and herein, the method further comprises:
  triggering a handover procedure to access the target cell in response to receiving the RRC reconfiguration message; and/or
  transmitting an RRC reconfiguration complete message in response to receiving the RRC reconfiguration message.

In the various embodiments above and herein, the method further comprises acquiring another system information if the validity timer expires.

In the various embodiments above and herein, the second NTN configuration is included in a serving cell configuration (e.g., for the target cell) of the ReconfigurationWithSync in the RRC reconfiguration message, and/or wherein the second NTN configuration is included in a neighbor cell list of the system information and/or not included in the RRC reconfiguration message.

In the various embodiments above and herein, the first NTN configuration includes at least a first validity duration and/or a first epoch time, and wherein the second NTN configuration includes at least a second validity duration and/or a second epoch time.

In the various embodiments above and herein, the UE starts or restarts the validity timer with a timer value set to a first validity duration from a subframe indicated by a first epoch time.

In the various embodiments above and herein, the UE starts the validity timer with a timer value set to a second validity duration from a subframe indicated by a second epoch time.

In the various embodiments above and herein, the validity timer is a validity timer for NTN UL synchronization and/or the validity timer is T430.

In the various embodiments above and herein, stopping the validity timer is at a first timing and starting the validity timer based on a second NTN configuration for the target cell is at a second timing.

In the various embodiments above and herein, the second timing is a timing after the first timing.

Referring back to FIGS. 3 and 4, in one or more embodiments from the perspective of a UE, the device 300 includes a program code 312 stored in memory 310 of the transmitter. The CPU 308 could execute program code 312 to: (i) receive a system information including at least a first NTN configuration for a serving cell; (ii) start or restart a validity timer for the serving cell in response to receiving the system information; (iii) receive an RRC reconfiguration message with ReconfigurationWithSync for a target cell; (iv) stop, in response to receiving the RRC reconfiguration message, the validity timer that is running based on the first NTN configuration; and (v) start the validity timer based on a second NTN configuration for the target cell. Moreover, the CPU 308 can execute the program code 312 to perform all of the described NW actions, steps, and methods described above, below, or otherwise herein.

Referring back to FIGS. 3 and 4, in one or more embodiments from the perspective of a NW, the device 300 includes a program code 312 stored in memory 310 of the transmitter. The CPU 308 could execute program code 312 to: (i) transmit to a UE a system information including at least a first NTN configuration for a serving cell; (ii) the UE starts or restarts a validity timer for the serving cell in response to receiving the system information; (iii) transmit an RRC reconfiguration message with ReconfigurationWithSync for a target cell; (iv) the UE stops, in response to receiving the RRC reconfiguration message, the validity timer that is running based on the first NTN configuration; and (v) the UE starts the validity timer based on a second NTN configuration for the target cell. Moreover, the CPU 308 can execute the program code 312 to perform all of the described NW actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
receiving a system information including at least a first Non-terrestrial Network (NTN) configuration for a serving cell;
starting or restarting a validity timer for the serving cell in response to receiving the system information;
receiving a Radio Resource Control (RRC) reconfiguration message with ReconfigurationWithSync for a target cell;
stopping, in response to receiving the RRC reconfiguration message, the validity timer that is running based on the first NTN configuration; and
starting the validity timer based on a second NTN configuration for the target cell.

2. The method of claim 1, further comprising:
triggering a handover procedure to the target cell in response to receiving the RRC reconfiguration message; and/or
transmitting an RRC reconfiguration complete message in response to receiving the RRC reconfiguration message.

3. The method of claim 1, further comprising acquiring another system information if the validity timer expires.

4. The method of claim 1, wherein the second NTN configuration is included in a serving cell configuration of the ReconfigurationWithSync in the RRC reconfiguration message, and/or wherein the second NTN configuration is included in a neighbor cell list of the system information and/or not included in the RRC reconfiguration message.

5. The method of claim 1, wherein the first NTN configuration includes at least a first validity duration and/or a first epoch time, and wherein the second NTN configuration includes at least a second validity duration and/or a second epoch time.

6. The method of claim 1, wherein the UE starts or restarts the validity timer with a timer value set to a first validity duration from a subframe indicated by a first epoch time.

7. The method of claim 1, wherein the UE starts the validity timer with a timer value set to a second validity duration from a subframe indicated by a second epoch time.

8. The method of claim 1, wherein the validity timer is a validity timer for NTN Uplink (UL) synchronization and/or the validity timer is T430.

9. The method of claim 1, wherein stopping the validity timer is at a first timing and starting the validity timer based on a second NTN configuration for the target cell is at a second timing.

10. The method of claim 9, wherein the second timing is a timing after the first timing.

11. A User Equipment (UE), comprising:
a memory; and
a processor operatively coupled to the memory, wherein the processor is configured to execute program code to:
receive a system information including at least a first Non-terrestrial Network (NTN) configuration for a serving cell;
start or restart a validity timer for the serving cell in response to receiving the system information;
receive a Radio Resource Control (RRC) reconfiguration message with ReconfigurationWithSync for a target cell;
stop, in response to receiving the RRC reconfiguration message, the validity timer that is running based on the first NTN configuration; and
start the validity timer based on a second NTN configuration for the target cell.

12. The UE of claim 11, wherein the processor is further configured to execute program code to:
trigger a handover procedure to the target cell in response to receiving the RRC reconfiguration message; and/or
transmit an RRC reconfiguration complete message in response to receiving the RRC reconfiguration message.

13. The UE of claim 11, wherein the processor is further configured to execute program code to acquire another system information if the validity timer expires.

14. The UE of claim 11, wherein the second NTN configuration is included in a serving cell configuration of the ReconfigurationWithSync in the RRC reconfiguration message; and/or wherein the second NTN configuration is included in a neighbor cell list of the system information and/or not included in the RRC reconfiguration message.

15. The UE of claim 11, wherein the first NTN configuration includes at least a first validity duration and/or a first epoch time, and wherein the second NTN configuration includes at least a second validity duration and/or a second epoch time.

16. The UE of claim 11, wherein the UE starts or restarts the validity timer with a timer value set to a first validity duration from a subframe indicated by a first epoch time.

17. The UE of claim 11, wherein the UE starts the validity timer with a timer value set to a second validity duration from a subframe indicated by a second epoch time.

18. The UE of claim 11, wherein the validity timer is a validity timer for NTN Uplink (UL) synchronization and/or the validity timer is T430.

19. The UE of claim 11, wherein stopping the validity timer is at a first timing and starting the validity timer based on a second NTN configuration for the target cell is at a second timing.

20. The UE of claim 19, wherein the second timing is a timing after the first timing.

* * * * *